US012586211B2

(12) United States Patent
Mackeprang

(10) Patent No.: US 12,586,211 B2
(45) Date of Patent: Mar. 24, 2026

(54) SYSTEM AND METHOD FOR EVENT DETECTION USING AN IMAGER

(71) Applicant: TRACKMAN A/S, Vedbaek (DK)

(72) Inventor: Mads Zingenberg Mackeprang, Hørsholm (DK)

(73) Assignee: TRACKMAN A/S, Hørsholm (DK)

( * ) Notice: Subject to any disclaimer, the term of this patent is extended or adjusted under 35 U.S.C. 154(b) by 275 days.

(21) Appl. No.: 18/334,685

(22) Filed: Jun. 14, 2023

(65) Prior Publication Data

US 2024/0420339 A1 Dec. 19, 2024

(51) Int. Cl.
 *G06T 7/20* (2017.01)
 *H04N 23/667* (2023.01)

(52) U.S. Cl.
 CPC .............. *G06T 7/20* (2013.01); *H04N 23/667* (2023.01); *G06T 2207/30224* (2013.01)

(58) Field of Classification Search
 CPC ............ G06T 7/20; G06T 2207/30224; H04N 23/667; H04N 23/651; G06V 10/62; G06V 20/52; G06V 20/42
 See application file for complete search history.

(56) References Cited

U.S. PATENT DOCUMENTS 11,351,436 B2 6/2022 Hendrix et al.
11,556,963 B2 1/2023 Katz et al.

11,557,044 B2 1/2023 Forsgren et al.
2012/0115610 A1* 5/2012 Otani .................... A63F 13/812
                                                                    463/36
2019/0228531 A1* 7/2019 Tofolo ...................... G06T 7/20

FOREIGN PATENT DOCUMENTS

WO 2009/019883 A1 2/2009

OTHER PUBLICATIONS

Yiu et al., "DeepVOG: Open-source pupil segmentation and gaze estimation in neuroscience using deep learning", Journal of Neuroscience Method, 2019, 12 sheets.
Hiemann et al., "Enhancement of Speed and Accuracy Trade-Off for Sports Ball Detection in Videos—Finding Fast Moving, Small Objects in Real Time", Sensors, May 6, 2021, 28 sheets.
Wang et al., "YOLOv7: Trainable bag-of-freebies sets new state-of-the-art for real-time object detectors", Computer Science > Computer Vision and Pattern Recognition, Jul. 6, 2022, 15 sheets.

(Continued)

*Primary Examiner* — Molly Wilburn
(74) *Attorney, Agent, or Firm* — Fay Kaplun & Marcin, LLP

(57) ABSTRACT

A system and an imager configured with operating parameters for capturing a sequence of images and a processor. The processor is configured to detect a ball in a first sequence of images captured by the imager configured with current operating parameters; analyze one or more conditions relating to motion of the ball or motion of a ball striking implement based on location information for the ball or the ball striking implement determined from the first sequence of the images; when the one or more conditions are satisfied, trigger a change in an operational state of the imager; and detect the ball in a second sequence of images captured by the imager configured with adjusted operating parameters.

22 Claims, 13 Drawing Sheets

(56)                    References Cited

OTHER PUBLICATIONS

Teed et al., "RAFT: Recurrent All-Pairs Field Transforms for Optical Flow", IJCAI, 2020, 5 sheets.

Milletari et al., "V-Net: Fully Convolutional Neural Networks for Volumetric Medical Image Segmentation", Computer Science > Computer Vision and Pattern Recognition, Jun. 15, 2016, 11 sheets.

Ronneberger et al., "U-Net: Convolutional Networks for Biomedical Image Segmentation", Computer Science > Computer Vision and Pattern Recognition, May 18, 2015, 8 sheets.

Hui et al., "LiteFlowNet: A Lightweight Convolutional Neural Network for Optical Flow Estimation", 2018, 9 sheets.

Trackman, "What is Spin Rate?", Jun. 24, 2014, 11 sheets. https://blog.trackmangolf.com/spin-rate/.

Wall et al., "Fully Equipped mailbag: What are the ideal launch and spin numbers for your irons?", Jul. 14, 2020, 11 sheets. https://golf.com/gear/irons/ideal-launch-spin-numbers-true-fully-equipped/.

Liu et al., "SSD: Single Shot MultiBox Detector", Computer Science > Computer Vision and Pattern Recognition, Dec. 29, 2016, 17 sheets.

Golf Journey 365, "Why Is Spin Rate Important in Golf? (Complete Overview)", 2022, 21 sheets. https://golfjourney365.com/why-is-spin-rate-important-in-golf-complete-overview/.

Yang et al., "Volumetric Correspondence Networks for Optical Flow", NeurIPS, 2019, 12 sheets.

Hopcroft et al., "Computer Science Theory for the Information Age", Singular Value Decomposition (SVD), Chapter 4, Jan. 18, 2012, pp. 110-134.

Eskofier et al., "Development of Pattern Recognition Methods for Golf Swing Motion Analysis", Proceedings of 8th International Symposium of the International Association of Computer Science in Sports, 2011, pp. 21-24.

* cited by examiner

Scene
200

Golf club
205

Single golf balls
215

Group of golf balls
210

Flowchart
<u>300</u>

310

305

315

330

320

325

405 — Receive frame

Flowchart
400

410 — Object Detection ball_1 ... ball_n
club_1 ... club_n

415 — BallManager

420 — BallObj1    BallObj2    BallObjn

425 — Set SceneTracker state

430 — Is Take-Away → Wait for next frame — 435

Yes

440 — Send trigger event

Flowchart
900

SYSTEM AND METHOD FOR EVENT DETECTION USING AN IMAGER

BACKGROUND

Systems have been developed for the tracking of sports balls and for analyzing player motions (e.g., swings, throwing and kicking motions, etc.) to, for example, enhance sports broadcasts and to facilitate athlete training, etc. These systems have included various tracking devices such as, for example, radars and imagers, to track and analyze the motion of a ball, the athlete and/or related items (e.g., rackets, bats, clubs, etc.).

SUMMARY

The present disclosure relates to a system which includes an imager configured with operating parameters for capturing a sequence of images; and a processor. The processor is configured to detect a ball in a first sequence of images captured by the imager configured with current operating parameters; analyze one or more conditions relating to motion of the ball or motion of a ball striking implement based on location information for the ball or the ball striking implement determined from the first sequence of the images; when the one or more conditions are satisfied, trigger a change in an operational state of the imager; and detect the ball in a second sequence of images captured by the imager configured with adjusted operating parameters.

In an embodiment, the current operating parameters comprise a first operational state and the adjusted operating parameters comprise a second operational state.

In an embodiment, the first operational state includes reduced operating parameters and power consumption relative to the second operational state.

In an embodiment, the operating parameters comprise a frame rate, a resolution or a crop of a subset of the images captured by the imager.

In an embodiment, a ball detection algorithm detects the ball, localizes the ball within the image, and determines location information for the ball within the image.

In an embodiment, the processor is further configured to track the ball across the images in the sequence to determine whether the ball is moving or stationary.

In an embodiment, a first condition of the one or more conditions is the ball being stationary.

In an embodiment, a detection algorithm for the ball striking implement detects the ball striking implement, localizes the ball striking implement within the image, and determines location information for the ball striking implement within the image.

In an embodiment, the processor is further configured to track the ball striking implement across the images in the sequence to determine whether the ball striking implement is moving or stationary.

In an embodiment, a second condition of the one or more conditions is the ball striking implement being within a predetermined distance from the ball.

In an embodiment, a third condition of the one or more conditions is the ball striking implement moving away from the ball at an angle within a predetermined range of angles.

In an embodiment, the second and third conditions are determined based on a type of the ball striking implement and wherein different types of ball striking implements are associated with different distance and angle thresholds.

In addition, the present disclosure relates to a method which includes detecting a ball in a first sequence of images captured by an imager configured with current operating parameters; analyzing one or more conditions relating to motion of the ball or motion of a ball striking implement based on location information for the ball or the ball striking implement determined from the first sequence of the images; when the one or more conditions are satisfied, triggering a change in an operational state of the imager; and detecting the ball in a second sequence of images captured by the imager configured with adjusted operating parameters.

In an embodiment, the current operating parameters comprise a first operational state and the adjusted operating parameters comprise a second operational state.

In an embodiment, the first operational state includes reduced operating parameters and power consumption relative to the second operational state.

In an embodiment, the operating parameters comprise a frame rate, a resolution or a crop of a subset of the images captured by the imager.

In an embodiment, a ball detection algorithm detects the ball, localizes the ball within the image, and determines location information for the ball within the image.

In an embodiment, the method further includes tracking the ball across the images in the sequence to determine whether the ball is moving or stationary.

In an embodiment, a first condition of the one or more conditions is the ball being stationary.

In an embodiment, a detection algorithm for the ball striking implement detects the ball striking implement, localizes the ball striking implement within the image, and determines location information for the ball striking implement within the image.

In an embodiment, the method further includes tracking the ball striking implement across the images in the sequence to determine whether the ball striking implement is moving or stationary.

In an embodiment, a second condition of the one or more conditions is the ball striking implement being within a predetermined distance from the ball.

In an embodiment, a third condition of the one or more conditions is the ball striking implement moving away from the ball at an angle within a predetermined range of angles.

In an embodiment, the second and third conditions are determined based on a type of the ball striking implement, wherein different types of ball striking implements are associated with different distance and angle thresholds.

In addition, the present disclosure relates to a system which includes an imager capturing a sequence of images of a ball in flight; and a processor. The processor is configured to perform following operations: detect the ball in a first and second image from the sequence of images; implement a dense optical flow (DOF) model to compute a pixel displacement across the first and second images; and compute three-dimensional spin parameters for the ball based on the pixel displacement.

In an embodiment, the imager is configured to crop the first and second images to eliminate portions of the images not including the ball prior to passing the first and second images to the processor.

In an embodiment, the first and second images are cropped to center the ball in each of a first cropped image and a second cropped image.

In an embodiment, detecting the ball in the first and second images is based on a deep learning (DL) based ball model.

In an embodiment, the DL based ball model is based on a segmentation network.

In an embodiment, the processor is further configured to perform the following operations: estimate a radius of the ball in each of the first and second images; and reshape the first and second cropped images so that the radius of the ball in the first reshaped image matches the radius of the ball in the second reshaped image.

In an embodiment, the DOF model is implemented in a DOF inferencing to generate a flow for a pair of images and wherein the operations further comprise: detecting the ball in n images from the sequence of images; and implementing the DOF model to generate a flow for each pair of consecutive images so that $n-1$ flows are generated.

In an embodiment, the processor is further configured to perform the following operations: apply a spatial and temporal coherence filter for the $n-1$ flows; and filtering out any flow that is non-coherent.

In an embodiment, the processor is further configured to perform the following operations: compute a median flow; and compute the three-dimensional spin parameters for the ball based on only the median flow.

Furthermore, the present disclosure relates to a method which includes detecting a ball in a first and second image from a sequence of images of the ball in flight; implementing a dense optical flow (DOF) model to compute a pixel displacement across the first and second images; and computing three-dimensional spin parameters for the ball based on the pixel displacement.

In an embodiment, an imager is configured to crop the first and second images to eliminate portions of the images not including the ball prior to passing the first and second images to a processor.

In an embodiment, the first and second images are cropped to center the ball in each of a first cropped image and a second cropped image.

In an embodiment, detecting the ball in the first and second images is based on a deep learning (DL) based ball model.

In an embodiment, the DL based ball model is based on a segmentation network.

In an embodiment, the method further incudes estimating a radius of the ball in each of the first and second images; and reshaping the first and second cropped images so that the radius of the ball in the first reshaped image matches the radius of the ball in the second reshaped image.

In an embodiment, the DOF model is implemented in a DOF inferencing to generate a flow for a pair of images. The method further includes detecting the ball in n images from the sequence of images; and implementing the DOF model to generate a flow for each pair of consecutive images so that $n-1$ flows are generated.

In an embodiment, the method further includes applying a spatial and temporal coherence filter for the $n-1$ flows; and filtering out any flow that is non-coherent.

In an embodiment, the method further includes computing a median flow; and computing the three-dimensional spin parameters for the ball based on only the median flow.

Furthermore, the present disclosure relates to a system which includes an imager and a processor. The imager has a field of view and being configured to operate in a normal state controlled by a first set of operating parameters for capturing a first sequence of images and in a high-speed state controlled by a second set of operating parameters for capturing a second sequence of images. The processor is configured to estimate a travel path for an object based on data extracted from the first sequence of the images or the second sequence of the images; and control the imager in the high-speed state to crop the images in the second sequence of the images containing a region of interest including the object. The processor controls the imager so the second sequence of the images contains the region of interest within the field of view and follows the estimated travel path for the object.

In an embodiment, the processor is further configured to detect a striking event involving the object by analyzing the first sequence of the images; and change the state of the imager by applying the second set of operating parameters for operating the imager in the high-speed state when the striking event has been detected.

In an embodiment, the object is a ball in flight and wherein the processor is further configured to estimate a travel path for the ball in flight based on the striking event.

In an embodiment, the processor is further configured to apply data extracted from the cropped images for adjusting the estimated travel path for the ball in flight for subsequently cropped images in the second sequence of the images.

In an embodiment, the object is a golf club and wherein the processor is further configured to estimate a travel path for the golf club based on the striking event.

In an embodiment, the processor is further configured to apply data extracted from the cropped images for adjusting the estimated travel path for the golf club for subsequently cropped images in the second sequence of images.

In an embodiment, the object is a golf ball and the processor in the high-speed state is further configured to detect a striking event involving a golf club striking the golf ball by analyzing the second sequence of the images; control the imager in the high-speed state to crop the images in the second sequence of the images containing a first region of interest including the estimated travel path of the golf club prior to the striking event; and control the imager in the high-speed state to crop the images in the second sequence of the images containing a second region of interest including the estimated travel path of the golf ball in flight after the striking event.

In an embodiment, the imager is arranged stationary above a location where the striking event is anticipated, and wherein a field of view of the imager contains the striking event and at least a part of the travel path.

In an embodiment, the imager has a camera sensor chip having a plurality of discrete pixel elements to be read out by a controller, and wherein the controller in the high-speed state is configured to address a subset of the discrete pixel elements for reading out a cropped image containing only the region of interest within the field of view.

In an embodiment, the processor is further configured to detect when the region of interest including the object exits the field of view; and change the state of the imager by applying the first set of operating parameters for operating the imager in the normal state until a further striking event has been detected.

In addition, the present disclosure relates a method which includes providing an imager having a field of view and being configured to operate in a normal state controlled by a first set of operating parameters for capturing a first sequence of images and in a high-speed state controlled by a second set of operating parameters for capturing a second sequence of images; estimating a travel path for an object based on data extracted from the first sequence of the images or the second sequence of the images; and controlling the imager in the high-speed state to crop images in the second sequence of the images containing a region of interest including the object. A processor controls the imager so the second sequence of images contains the region of interest within the field of view and follows the estimated travel path for the object.

In an embodiment, the method further includes detecting a striking event involving the object by analyzing the first sequence of the images; and changing the state of the imager by applying the second set of operating parameters for operating the imager in the high-speed state when the striking event has been detected.

In an embodiment, the object is a ball in flight and the method further includes estimating a travel path for the ball in flight based on the striking event.

In an embodiment, the method further includes applying data extracted from cropped images for adjusting the estimated travel path for the ball in flight for subsequently cropped images in the second sequence of the images.

In an embodiment, the object is a golf club and the method further includes estimating a travel path for the golf club based on the striking event.

In an embodiment, the method further includes applying data extracted from the cropped images for adjusting the estimated travel path for the golf club for subsequently cropped images in the second sequence of the images.

In an embodiment, the object is a golf ball, and the method further includes detecting a striking event involving the golf club striking the golf ball by analyzing the second sequence of the images; controlling the imager in the high-speed state to crop the images in the second sequence of the images containing a first region of interest including the estimated travel path of the golf club prior to the striking event; and controlling the imager in the high-speed state to crop the images in the second sequence of the images containing a second region of interest including the estimated travel path of golf ball in flight after the striking event.

In an embodiment, the imager is arranged stationary above a location where the striking event involving the object is anticipated, and wherein a field of view for the imager contains the striking event and at least a part of the travel path.

In an embodiment, the imager has a camera sensor chip having a plurality of discrete pixel elements to be read out by a controller, and wherein the controller in the high-speed state is configured to address a subset of the discrete pixel elements for reading out a cropped image containing only the region of interest within the field of view.

In an embodiment, the method further includes detecting when the region of interest including the object exits the field of view; and changing the state of the imager by applying the first set of operating parameters for operating the imager in the normal state until a further striking event has been detected.

In an embodiment, the processor is further configured to control the imager in the high-speed state to crop the images in the second sequence of the images containing the first region of interest including the estimated travel path of the golf club after the striking event.

In an embodiment, the method further includes controlling the imager in the high-speed state to crop images in the second sequence of the images containing the first region of interest including the estimated travel path of the golf club after the striking event.

DETAILED DESCRIPTION

Figure 1:
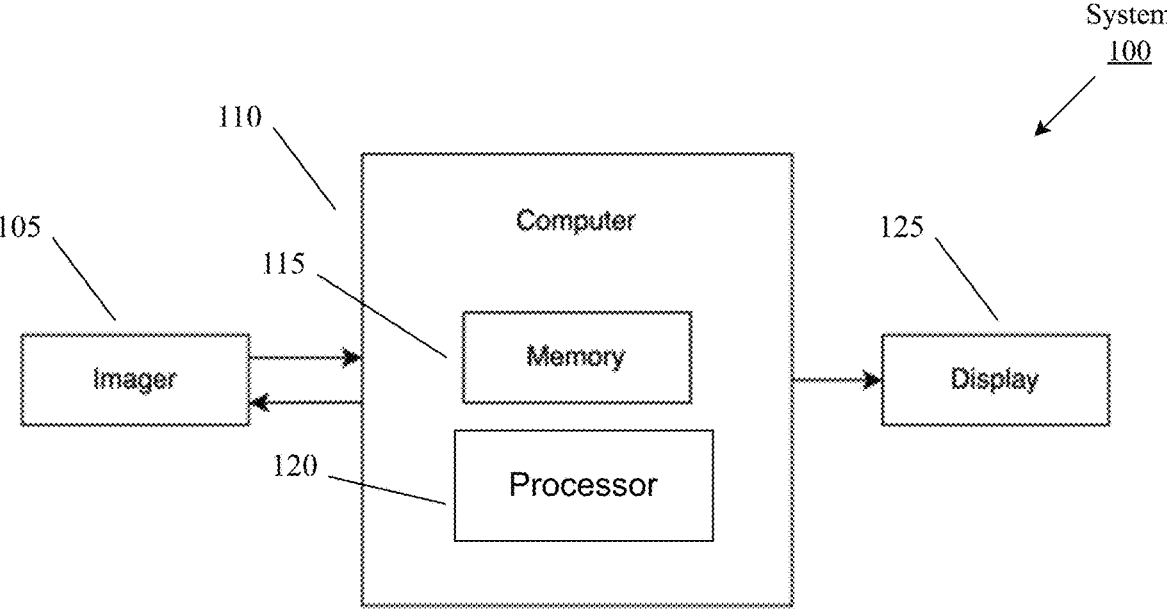
FIG. 1 shows an exemplary system according to the present disclosure.

The exemplary embodiments may be further understood with reference to the following description and the related appended drawings, wherein like elements are provided with the same reference numerals. The exemplary embodiments relate to systems and methods for event detection and/or parameter determinations for sports game applications. In particular, these detections and/or determinations can be performed using image processing techniques on a sequence of images, e.g., from an imager (e.g., from a single imager). In some aspects of these exemplary embodiments, the system can change an operational state of the imager based on the detection of a triggering event, for example, so that the imager transitions from a low power state with relaxed operating parameters to a high power state with more energy-intensive operating parameters.

In other aspects, the high power state for the imager relates to an increased frame rate, increased resolution, and/or other operating parameters suitable for the detection of certain events and/or the derivation of certain parameters. In one illustrative embodiment, the high power state is used to capture images suitable for the derivation of impact and/or launch parameters of a sports ball. In one aspect, the system in the high power state can measure a three-dimensional (3D) spin axis of the sports ball. Some embodiments are described with regard to the launch of a golf ball, however, the exemplary embodiments can be applied for a variety of different sports, to be explained in detail further below.

In certain illustrative embodiments a single imager is used to capture a sequence of images that may be processed by a computing device in a variety of operations including, for example: object detection; object tracking; event detection; state detection; parameter determinations; etc. These operations will be referred to herein collectively as "detections" or "determinations." These various operations require different image capture parameters and associated processing burdens for performing the detection or determination. In one non-limiting example, certain detections may require a high frame rate while others may be performed with a low frame rate. Similarly, different resolutions or lighting conditions may be necessary or appropriate for different types of detections. Some detections may impose a high processing burden on the computing device while others may impose a relatively low processing burden.

Various types of detections related to the game of golf, e.g., object detections, state detections, or event detections, that can be performed based on a sequence of images (or a single image) from, e.g., a single imager, include, for example: ball detection; ball motion tracking; a club detection (including identifying a type of club in use); club motion tracking (including different aspects of a swing progression, e.g., backswing, downswing, etc.); detection of a type of swing (e.g., putt, chip shot, flop shot, full swing, half swing, etc.); detection of impact between the club and the ball; determination of an impact location on the club; etc.

Various parameters related to the game of golf that can be determined based on a sequence of images (or a single image) from, e.g., a single imager, include, for example: determination of an initial speed for a struck ball; identification of an initial direction of travel for a struck ball; club parameters such as an attack angle, dynamic loft, dynamic lie, club path, club speed, and face angle; a distance from the imager to the ball; etc.

Various image capture parameters relevant to the acquisition of a sequence of images (or a single image) from an imager include, for example: a frame rate; resolution; zoom; lighting conditions; wavelength (e.g., visible spectrum, infrared spectrum, etc.); identification of a region of interest (ROI) (e.g., crop); position and orientation; etc. It is noted that some imagers have capabilities different from those of other imagers, e.g., some imagers may be capable of image capture at a higher frame rate or resolution than others, and some imagers have adjustable image capture parameters, e.g., variable frame rate or resolution (up to a maximum).

Some detections/determinations related to the game of golf are preferably or necessarily performed with certain image capture parameters, e.g., minimum operating parameters necessary to capture images that allow the derivation of the desired parameters, while other detections and/or determinations can be performed with more relaxed image capture parameters. In one illustrative example, the determination of impact parameters for the golf club is preferably performed by capturing a number of images directly prior to, directly subsequent to, or both prior and subsequent to the actual impact-including, for example, one or more images as near to the time of impact as possible.

In another illustrative example, the determination of launch parameters for the ball is performed by capturing a number of images just after impact. Depending on a desired level of accuracy, due to the relatively high speed of the club and the ball at impact, the imager should capture these images at a relatively high frame rate to provide to a computing device a number of images sufficient to allow for the determination of these impact parameters. Conversely, in another example, the detection of certain events related to the swing (e.g., a backswing) may require fewer images (e.g., only two or three) captured at a relatively low frame rate.

Relatedly, different image capture parameters, types of detections and types of determinations may impose different processing requirements on the imager and/or the computing device processing the image data. These different imager settings and associated processes also lead to differences in power consumption. In one illustrative example, higher frame rates, resolutions, lighting conditions, etc., for the imager entail higher processing burdens and power consumption than lower frame rates, resolutions, lighting conditions, etc. In another illustrative example, some object detection algorithms (ball detections, club detections) may be run continuously on every image acquired by the imager without imposing a high processing burden while in still another illustrative example, the detection of impact parameters will impose a significant processing burden due to the complexity of the calculations required.

U.S. Pat. No. 10,953,303 describes systems and methods for determining impact characteristics of a sports ball with a sport ball striking element based on images, e.g., from a single imager, and is hereby incorporated by reference in its entirety. U.S. Pat. No. 11,452,911 describes systems and methods for determining launch characteristics of a sports ball based on images from, e.g., a single imager and is hereby incorporated by reference in its entirety.

A system (including at least an imager and an associated computing device) can be selected for use based on the types of detections/determinations which the system is intended to perform. Some systems may have limited imager capabilities and/or processing capabilities and may be used for simpler detections/determinations, while others may have advanced imager capabilities and/or processing capabilities and may be used for more complex detections/determinations. In one illustrative example, an advanced imaging and processing apparatus is used to determine impact parameters while a simpler imaging and processing apparatus, or the same imaging device operated in a less data intensive manner, is used to analyze swing motion. In another illustrative example, a particular position and orientation of the imager is preferred or required to permit the imager to capture images suitable for the intended data intensive detection/determination.

It should be understood that, when an advanced imaging/processing system is implemented, the system need not continuously run at its highest level. For example, if a system is intended for the determination/detection of a variety of different parameters, events or states, the operating parameters of the system can be manually or automatically adjusted depending on current needs. Some image processing algorithms can be run continuously or semi-continuously, while others are run only occasionally. As described above, some image capture parameters/settings are appropriate for certain detections/determinations, while other image capture parameters/settings are appropriate for other detections/determinations.

Accordingly, those skilled in the art will understand that some imaging systems, including an imager capturing a sequence of images and a computing device for processing the captured images and deriving/detecting parameters/ events from the images, may enter different modes or states of operation based on the types of detections/determinations to be performed at a given time. Such a system may operate in a lower power state when relatively simple detections/ determinations are being performed and may operate in a higher power state when more complex detections/determinations are being performed. Some systems may be capable of advanced imaging processes, e.g., high frame rate and/or high resolution image capture, yet be limited by the available processing capabilities of the associated computing device. Thus, these systems may not be able to operate according to their maximum capabilities at all times as unacceptable delays in processing may occur when the system is not able to process all the data captured in a timely manner.

Even when advanced imaging capabilities and significant processing resources are available, it may be desirable to limit the operations of the imager and/or the computing device to conserve power, prevent overheating, or for other reasons, particularly when certain operations are not required at a particular time. It may be useful to limit the time during which an imager is operating in a high power state and/or to limit the computational burden for a CPU/ GPU whenever possible—particularly when the system is configured to perform detections/determinations that require complicated calculations.

According to various exemplary embodiments described herein, systems and methods are described for the detection of events and the determination of parameters from a sequence of images captured by, for example, a single imager although additional imagers may be employed as desired. In some aspects, methods are described for changing a state of one or more aspects/components of the system in dependence on detections/determinations to be made prior to an anticipated upcoming event. In particular, certain embodiments operate by changing operating parameters and/or a power state of an imager and/or computing device when a particular upcoming event is anticipated. The detection of an object and/or event while the system is in a first state, e.g., a lower power state including relaxed operating parameters for the imager, then triggers the system to transition to a second state, e.g., a higher power state including operating parameters for the imager suitable for further operations, detections, or determinations, to be described in greater detail below.

In one aspect of these exemplary embodiments, operations are described for the determination of spin parameters for a struck ball from a sequence of images captured, for example, by a single imager. Previous systems for determining spin parameters include multiple imagers and/or other sensors, e.g., radar, and there are no known existing systems that can determine spin parameters from a single image stream of a single imager as in this illustrative embodiment.

As will be described in greater detail below, the determination of spin parameters using a single imager according to these exemplary embodiments is a computationally complex operation and is preferably performed under specific imager settings including a high frame rate, e.g., greater than 100 frames per second (fps), a crop (e.g., region of interest (ROI)) centered on the ball; a higher intensity light exposure; etc. As understood by those skilled in the art, higher frame rate, intensity light and processing requirements generate more heat and require more processing power for the computing device. Thus, it is preferable to minimize the duration of time for which the system is in the high power state.

Accordingly, in another aspect of these exemplary embodiments, operations are described for detecting trigger events that indicate an upcoming event that requires the high power mode is likely to occur soon and/or within a calculated time and for adjusting system settings (e.g., transitioning the imager into a high power state with more intensive operating parameters) in response to the trigger event (i.e., in anticipation of the upcoming event). In some embodiments, the trigger event detection immediately triggers the transition to a high power state. In other embodiments, the transition to the high power state is initiated only after a predetermined delay time has elapsed. The transition may be delayed when, for example, the timing of the anticipated upcoming event is estimated to occur only after a predetermined time has elapsed since the detection of the trigger event.

With regard to the game of golf, various examples according to these exemplary embodiments will be described in detail below. In one illustrative embodiment, an exemplary system comprises an imager mounted to the ceiling and oriented so that the imager looks downward at the scene area, e.g., a hitting location for a golfer, so that the imager has a field of view including a launch area. In these embodiments, the system is intended to capture the impact and launch of a ball in extremely high detail, thus requiring the imager to operate in a high power state with a high frame rate during times immediately surrounding the launch of a ball. Various triggering events to be described in detail below inform the system's decisions of when and where in the imager to turn up higher intensity recording modes.

It should be understood that the principles described herein can be applied to a variety of use cases. Processing logic may be tailored to a variety of scenarios in which the occurrence of an upcoming event can be predicted and the timing of this upcoming event can be approximated. Various examples will be provided below of methods for optimizing the operation of an imaging system to reduce or minimize the amount of time the system is in a high power state of operation while ensuring a high degree of accuracy in its parameter estimations.

FIG. 1 shows an exemplary system 100 including an imager 105, a computer 110 comprising a memory 115 and a processor 120, and a display 125. The system 100 may be implemented in a variety of different settings. In one illustrative example, one or more components of the system 100 is mounted on a ceiling or some other structure at a height above the scene to be viewed with the imager 105 orientated so that its field of view is facing downward at the scene area. In these embodiments, the system 100 may be implemented, e.g., at a driving range or in an indoor golf setting such as a golf simulator. However, the exemplary embodiments are not limited to this arrangement. As will be described in further detail below, the system 100 may be tailored to different golf settings, e.g., with the imager 105 in different positions/orientations, or other sports settings. Additionally, in some scenarios, the system 100 may include additional sensors.

The imager 105 of this embodiment is configured to capture image data (images or frames) of a scene within its field of view (FOV) including a launch location for a golf ball and the area immediately in front of the launch location. The imager 105 can be configured for different operational settings, e.g., frame rate, resolution, zoom, crop, etc. The imager 105 in these embodiments is selected to have a maximum frame rate sufficiently high to capture multiple images of a ball in flight as the ball traverses its FOV, e.g., greater than 100 frames per second (fps). However, the imager 105 can also be configured to capture images at a lower frame rate.

The imager 105 may have a rolling shutter, e.g., capturing image data one line (of pixels) at a time in a pattern that moves sequentially across a light-sensitive chip of the imager 105. In such a case, the imager 105 is preferably oriented so that a direction across the imager in which the pixels are exposed through the rolling shutter (i.e., a direction from a first line of pixels to be exposed to the next line of pixels to be exposed, etc.) is the same as an expected direction of movement of the ball across the field of view of the imager 105. At high frame rates, when using an electronic rolling shutter, the image sensor can continue to gather photons during the acquisition process, thus effectively increasing sensitivity. The effect is most noticeable when imaging extreme conditions of motion or the fast flashing of light. The imager 105 of this embodiment is configured to operate in a selected wavelength band. For example, the imager 105 may operate in the visual spectrum, the infrared spectrum, or the near-infrared spectrum. For indoor settings, the field of view of the imager 105 may be lighted by one or more light sources (not shown) to achieve the desired quality of the images.

In some aspects, the computer 110 may be integral with the imager 105 or the computer 110 may comprise a separate processing apparatus. The computer 110 may be connected to the imager 105 by a wired or wireless connection. For example, the imager 105 and the computer 110 may include respective transceivers (not shown) for sending and receiving data, as would be understood by those skilled in the art. The computer may store computer-readable data in the memory 115 for execution by the processor 120. For example, the memory 115 may contain various image processing algorithms such as, e.g., ball detection; object detection; event detection; deep learning (DL) models; dense optical flow (DOF) models; pre-processing; post-processing; etc., to be described in greater detail below. The results of the analyses, e.g., parameter determinations, can be presented to a user by a display 125. For example, the spin parameters for a launched ball can be provided by the display 125.

In some aspects, the computer 110 may transmit commands to the imager 105 to adjust the operational state of the imager 105. For example, based on the output of some image processing algorithms executed on the stream of images from the imager 105, the computer 110 can determine an event is upcoming and transition the imager 105 into a higher power state, e.g., for the capture of launch parameters. When this event has been observed as required, the computer 110 may then transmit commands to the imager 105 to adjust the operational state of the imager back to the low power state.

In the low power state, the imager 105 provides to the computer 110 a continuous stream of images at a low framerate (e.g., 1-100 images per second) and/or, alternatively, at a low resolution. In this low power state, the computer 110 continuously or semi-continuously executes one or more object detection algorithms for each frame received from the imager 105. The processor 120 detects all the relevant objects in the scene using an object detector suitable for that purpose and stores the information in the memory 115. The object detection algorithms can include, e.g., a ball detector and a club detector as would be understood by those skilled in the art.

Various types of object detectors of varying complexity may be used according to the present embodiments. For example, in some applications, where high precision is desired (e.g., for a ball detection algorithm) pixel locations corresponding to the ball can be precisely determined. In other examples, high precision may not be necessary or useful for the ball detection algorithm. Object detectors such as, e.g., YoloV3 or Faster-RCNN, are commonly used within computer vision and/or AI/deep learning applications. As is understood by those skilled in the art, object detectors can be designed by those skilled in the art to detect particular types of objects on which the object detector is trained, e.g., with training data having detailed annotations. The object detectors can either be created from scratch or by retraining already available models.

Figure 2:
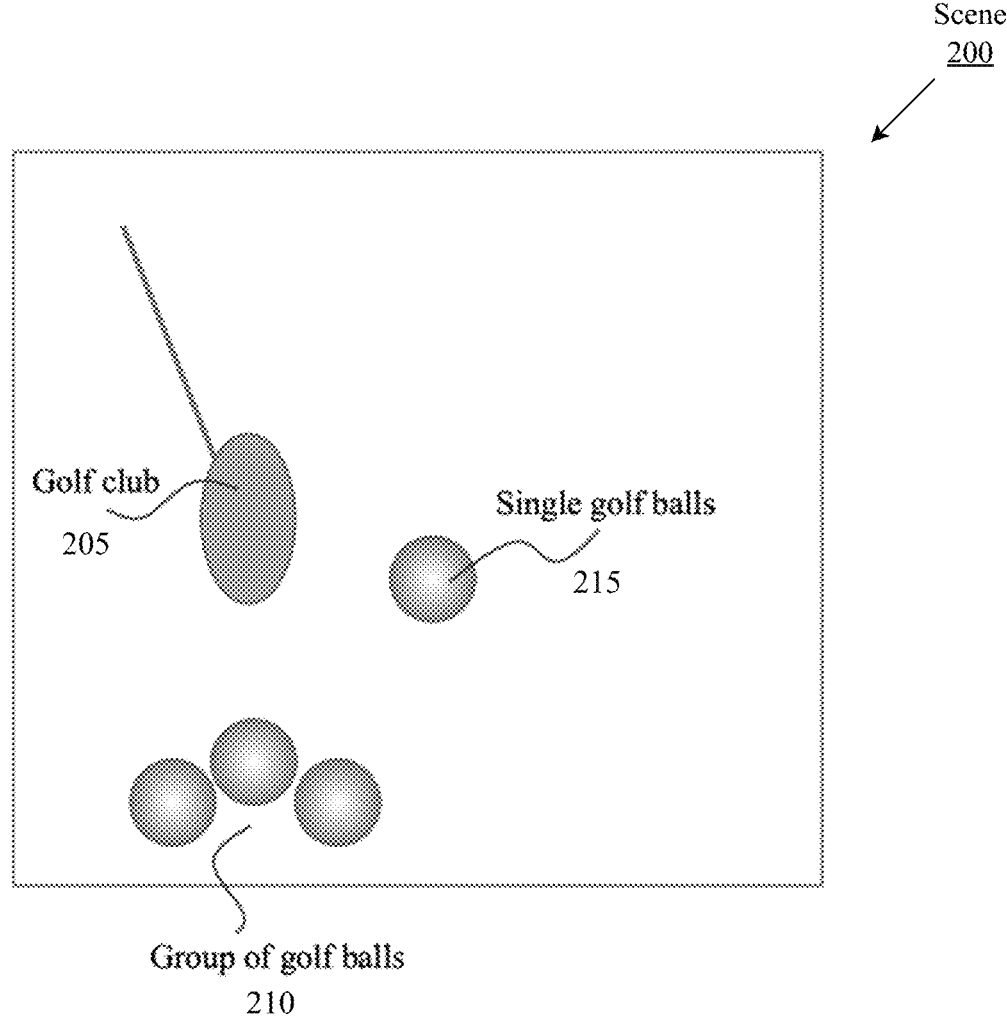
FIG. 2 shows an exemplary image captured by an imager of the system shown in FIG. 1.

In some aspects of these exemplary embodiments, a ball detector is configured to detect a single ball and/or a group of balls and a club detector is configured to detect a golf club and/or identify a type of the golf club using, for example, a classifier to determine a type of club detected in any image. FIG. 2 shows an exemplary image 200 captured by the imager 105 described in FIG. 1. The image 200 includes a golf club 205, a group of golf balls 210 and a single golf ball 215 separate from the group of golf balls 210. A ball detector detects the single golf ball 215 and the golf balls included in the group of golf balls 210 while a club detector detects the golf club 205.

The motions of objects detected in earlier images can then be tracked by analyzing the earlier and subsequent images by an object handler implemented on the computer 110. For example, the object handler may match objects detected in a current image to objects detected in previous images (e.g., based on object type, classification and location). This provides temporal information about each object which can be used to determine whether each object is moving or static, and, for an object that is determined to be moving, to determine a direction/trajectory of motion and a velocity of the object. This related information between two objects of different object types is used to inform the system of the type of an event that is being observed within the scene and whether the system needs to change its current state. The change of system state would resolve if the system needs to, for example, change one or all of: a framerate of the imager from low (e.g., 1-100 fps) to high (e.g., 101-3,000 fps); an image resolution; and a crop (if any) of the images. This information is given by the object handler based on the currently occurring event type as identified by the system.

Figure 3:
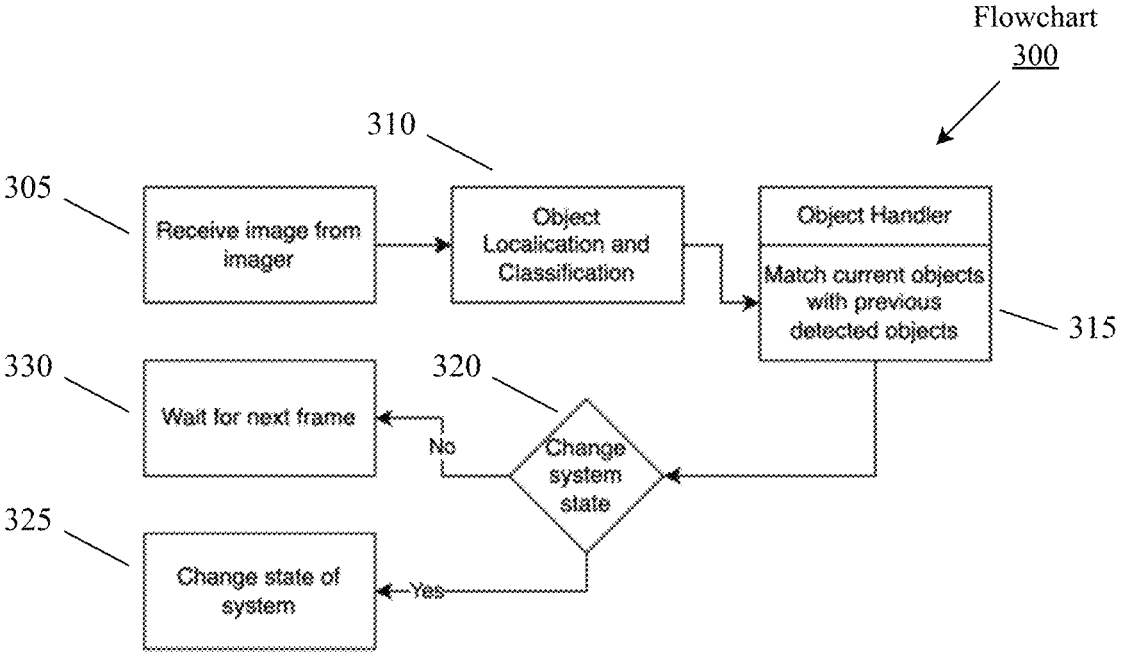
FIG. 3 shows a flowchart for changing a state of the system based on an event detection.

FIG. 3 shows a flowchart 300 for changing the state of an imaging system based on the detection of events and/or conditions according to one example. The algorithmic steps for the flowchart 300 are described in general as follows, and a more detailed description is provided further below.

In 305, a current image is received from the imager. In 310, objects within the current image are localized and classified. Information about these objects, e.g., type, location, etc., is provided to the object handler. For example, the detected objects can comprise one or more balls and/or clubs.

In 315, the object handler matches the objects from the current image with previously detected objects. If the current object was not previously detected, a new object is identified and this information is stored by the object handler. The object handler then employs logic to determine whether a selected event of interest is occurring or is soon to occur, e.g., based on motion of the object between successive images or across a number of previous images, as will be described in greater detail below. In 320, the object handler determines whether to change the state of the system based on the analysis of the detected motion of the object and the object's identity (i.e., has a trigger event occurred). Based on the determination of 320, the system can either change its state (325) or wait for a next frame (330). The steps 305-330 may then be repeated upon receipt of the next frame.

The purpose of event-based detection may be to change the internal setting of an imager to, for example, enables a high-speed capture of images (e.g., high speed capture of images of a time and location including a time and location at which a golf ball will be launched by contact with the head of a moving golf club). For example, when the head of a golf club in motion is detected close to (or on a path determined to intersect with) the location of a single golf ball (e.g., a golf ball separate from other golf balls), the system may determine that a ball is about to be struck.

More specifically, when the single golf ball is not moving and the head of the golf club starts to move away from the single golf ball at a velocity and/or acceleration within a predetermined range, the system will identify this as a trigger event (e.g., a backswing in a location or on a trajectory presaging a swing at a ball) indicating that the ball will soon be struck and the system needs to change to an impact detection/analysis mode or determining a delay time after which the system will change to the impact detection/ analysis mode. In this impact detection/analysis mode the system may change the operation of the imager from a low framerate to a high framerate and/or may change the image resolution of the images. The system may also identify a region of interest (i.e., including the location of the single ball), so that the single golf ball is, for example, centered in a cropped image sized to include the head of the golf club at impact (i.e., reducing the size of the image to reduce the number of pixels to be analyzed) to obtain clear and detailed images at or close to a time of impact of the golf ball.

In one example, when the imager in its normal operating state (e.g., low power state) captures images at 40 FPS, each image is a static representation of the observed scene and thus the type of objects present in the scene. In this example, the time interval between consecutive images is 0.025 seconds. If the same object is identified at different locations in two or more consecutive images, a motion type and direction may be determined.

For example, if the same golf ball is identified in multiple consecutive images but in different image coordinates (u, v) while the camera remains in the same position and aimed in the same direction, the golf ball is determined to be in motion. If a golf ball is determined not to be in motion but lies still and at the same time, a golf club is moving slowly toward and away from the golf ball within a predefined distance of the golf ball, the system may determine that the golfer is addressing the golf ball and the intention of the person holding the golf club is to begin a back swing prior to hitting the golf ball. Given a known physical size and shape of a golf ball, a conversion from pixels to meters can be calculated (e.g., to determine based on a known radius of the ball and a width of the image of the ball in a number of pixels, a distance represented by other pixels located the same or a similar distance from the camera).

If the system has detected that the golfer is addressing the golf ball, the system analyzes subsequent images to identify a back swing (e.g., by analyzing the images to determine whether the golf club has begun to move away from the golf ball at a constant or increasing velocity over at least a predetermined range of motion). When a golf club has been localized by the object detector, the golf club type may also be classified by a classifier. Golf club types may be, for example, Drivers, Woods, Hybrids, Irons, etc. or to precisely identify clubs (4 iron, pitching wedge, etc.). Based on the classified club type, the threshold requirements (e.g., speed and range of motion required to identify motion as a back swing) may vary. These variables may also be varied based on historical data concerning the swing patterns of each of a plurality of golfers with a plurality of club types.

Figure 4:
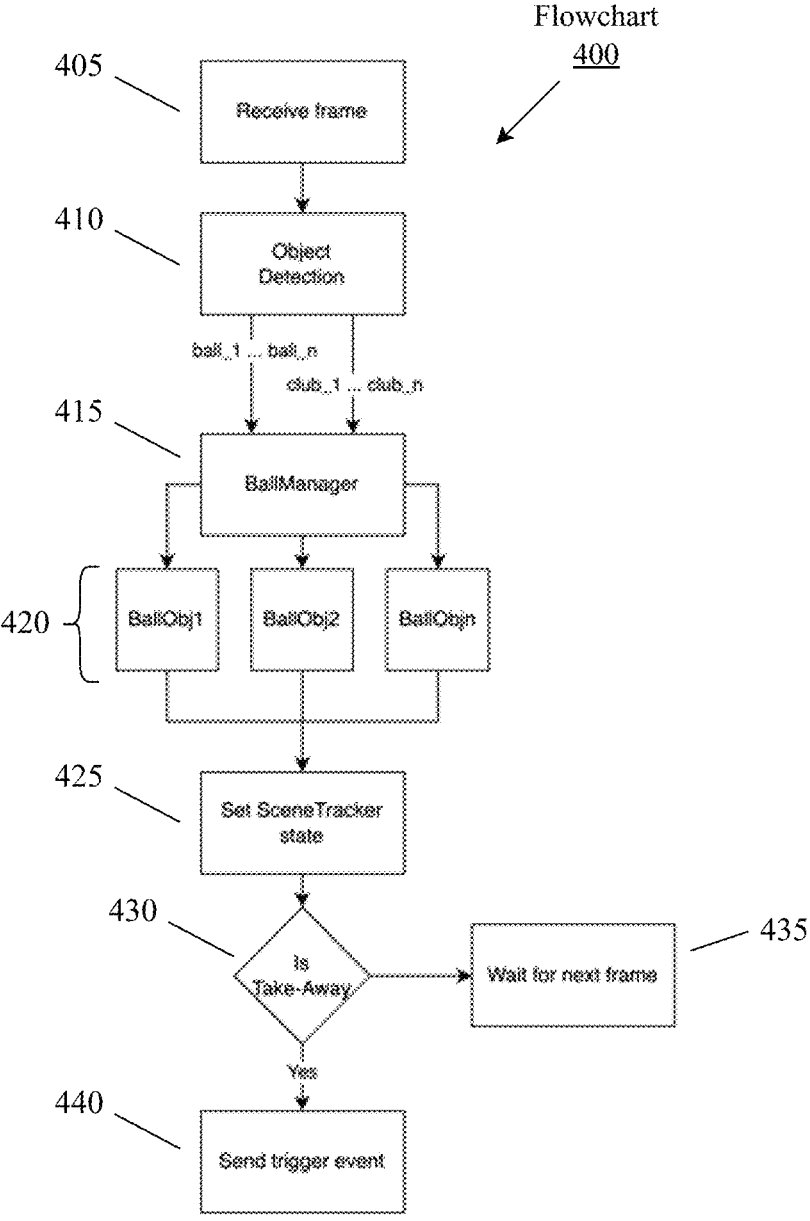
FIG. 4 shows a method for changing the state of an imaging system based on the detection of events according to another exemplary embodiment.

FIG. 4 shows a flowchart 400 for changing the state of an imaging system based on the detection of events according to another exemplary embodiment. In 405, a current image is captured by the imager and sent to a processing unit. In 410, objects within the current image are detected and identified (i.e., classified). An object detector detects and localizes all relevant objects, i.e., the object detector identifies and locates all the golf balls and golf clubs visible in the image. In 415, the ball manager (e.g., object handler) matches the objects from the current image with previously detected objects. If the current object was not previously detected, a new object is identified and this information is stored by the object handler. In this example, 'n' objects 420 are identified by the object handler. If any clubs are identified, the club can be classified by type, e.g., driver, iron, putter, etc.

In 425, based on the information determined by the ball manager for the objects in the scene, the scene can be tracked. In one example, if a ball is detected to be separated from other balls/objects (and stationary) with a club nearby, the parameters may be set to determine whether a swing is occurring. As described above, different parameters for swing motion may be applied based on the club type. In 430, it is determined whether a swing, e.g., a take-away portion of the swing, is occurring. The term "take-away" as used herein refers to a portion of the backswing from setup to the point where the club is substantially parallel to the ground. In 435, if a take-away is not occurring, the system waits to receive another image. In 440, if the take-away is occurring, the system sends a trigger event to adjust the operational state of the imager.

Figure 5:
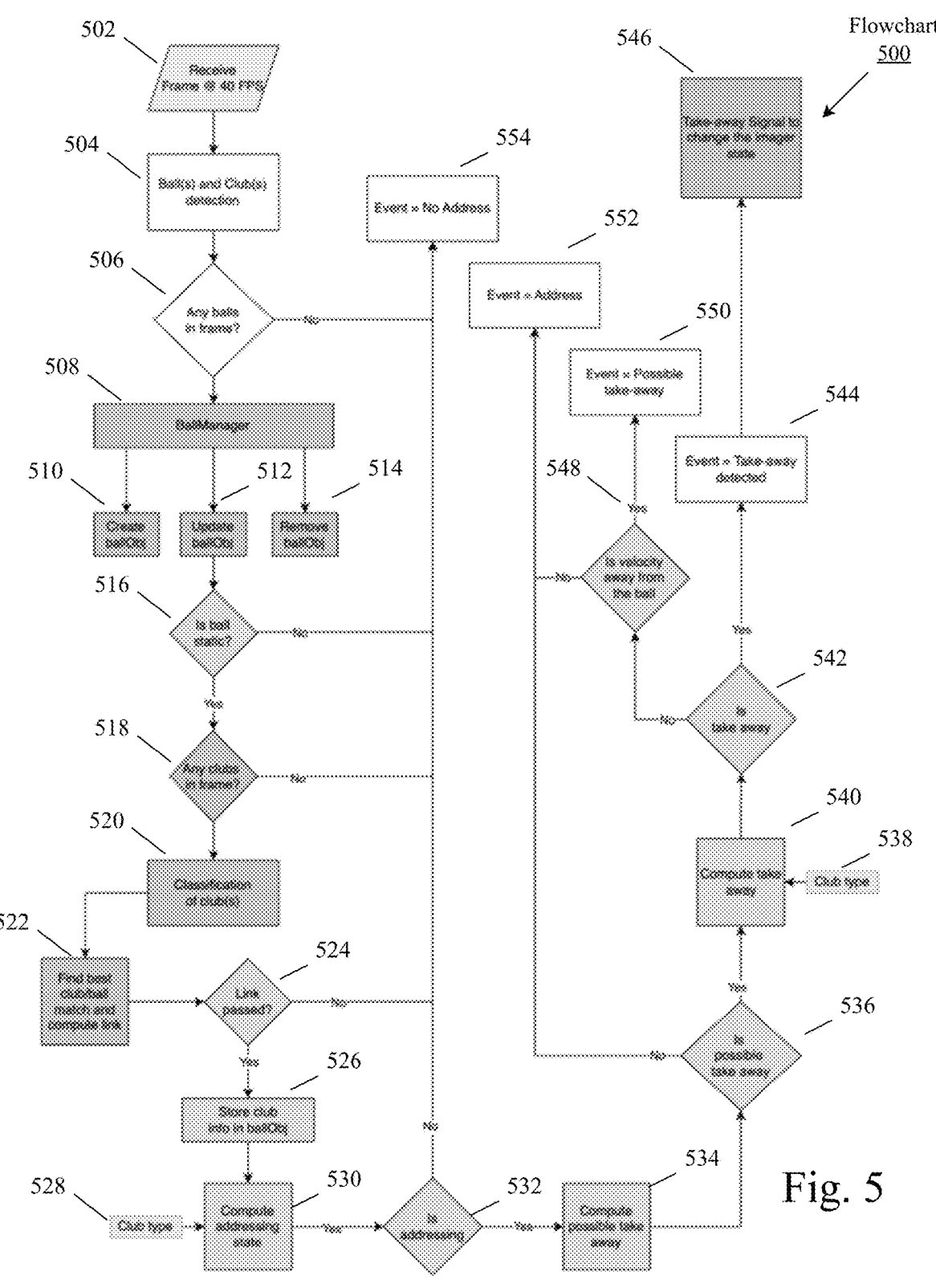
FIG. 5 shows a method for changing the state of an imaging system based on the detection of events according to still another exemplary embodiment.

FIG. 5 shows a flowchart 500 for changing the state of an imaging system based on the detection of events according to still another exemplary embodiment. A link in the flowchart 500 has the property of information if the link is relevant for further processing or not, to be described in detail below. The term "link" as used herein refers to a branch in the flowchart 500 including a step for gathering data, a step analyzing data, and a step determining based on the analysis whether a state change event has occurred. The flowchart 500 comprises links that, if satisfied, lead to the detection of a state. The states in the system can be, 'no address', 'address', 'possible takeaway', and 'takeaway'. If none of the links passes the system state is set to 'no address' and nothing needs to change system-wise. The processing logic for determining the 'address' state is ultimately based on a distance and angle threshold for a given club type relative to the ball. However, in this example, multiple prerequisite steps are to be satisfied prior to the 'address' determination.

In 502, a current image is captured by the imager and sent to a processing unit. In 504, objects within the current image are detected. An object detector detects and localizes all relevant objects, i.e., the object detector locates all the golf balls and golf clubs visible in the image. In 506, if a golf ball is present, the location of the ball is stored in memory and the method proceeds to 508. If no golf ball is present, the method proceeds to 554. The processing of the image is considered done and the processor waits for the next image.

In 508, when one or more balls is detected, and a ball manager determines if the ball has been located in previous frames or if the detected ball is a new ball. If the ball is new, in 510, a new entry in a tracking log is created. If the ball is known, in 512, the location of the ball is updated. If a previously tracked ball is not detected, in 514, the entry in the tracking log for the ball is removed. The purpose of the ball manager is to keep track of all detected golf balls, to always know if a new ball has entered or has left the field of view, and to update the location of already known golf balls.

In 516, if a golf ball is static, the method proceeds to 518. The golf ball can be determined to be static if, for example, two or more consecutive images are captured in which the same ball is detected at the same location. If the golf ball is not static, the method proceeds to 554 and the processing of the image is considered done. In 518, if a club is detected when the golf ball is static, the method proceeds to 520. At this stage, the club can be detected anywhere in the image. If the club is not detected, the method proceeds to 554 and the processing of the image is considered done.

In 520, the detected club is classified. The specific club type is important for the event detections 530 and 540 described below because different clubs may be swung differently. For example, a pitching wedge may be swung with a shorter and slower swing and backswing than would be expected with a driver. Thus, these considerations may impact the timing at which the system enters the high power mode. In 522, a link is computed between the club and the ball. For example, some distance threshold may be set between the club and ball. If a link passes in 524, the state may be about to change and the method proceeds to 526. If the link does not pass, the method proceeds to 554 and the processing of the image is considered done.

In 526, the club information is stored and, based on the club type 528, the addressing state is computed in 530. For example, the addressing state for a driver may be different from the addressing state for an iron or a putter. To compute both the addressing event and the take away event knowing the specific club type is important. Based on the club type the different logical thresholds and certain motions will be either included or neglected during the computation of the events. For example, when swing a Driver, a user may address the golf ball from a stance at a large distance from the golf ball and with a swing having a substantially constant circular motion whereas a putter normally is generally addressed with the golfer taking a stance very close to the golf ball and with the motion of the head of the putter being kept fairly constant in speed during the swing and backswing.

In 532, it is determined whether an address is occurring. If an address is detected, the method proceeds to 534. If an address is not detected, the method proceeds to 554 and the processing of the image is considered done. If an address event has been determined the processor determines whether the stored sequence of link and thus golf club and golf ball localization relation trigger a 'possible take away' event.

In 536, it is determined whether a possible take away is occurring. If a possible take away has been determined, the method proceeds to 540. If the possible takeaway is not detected, the method proceeds to 552 and a potential address event is analyzed. In 540, the take away condition is computed in view of the club type 528. In 542, it is determined whether a 'take away' event is occurring. If the take away is detected, the method proceeds to 544. If the take away is not detected, the method proceeds to 548. In 548, if the velocity of the club is directed away from the ball, the method proceeds to 550 and the possible take away event is detected. If the velocity of the club is not away from the ball, the method proceeds to 552 and the address event is determined. If a 'take away' event is detected in 544, in 556, the processor tells the system to change its state. This means that the imager will change from a low frame rate and full sensor field of view to a high frame rate and a small ROI placed such that the golf ball from the triggered link is located in the center.

Those skilled in the art will understand that many different types of event-based logic may be employed in a variety of scenarios to change the state of sports analysis systems according to exemplary embodiments and these exemplary embodiments are not limited to the exemplary scenario described above or to golf in general. Various series of events in a variety of sports and sports scenarios may follow known patterns or progressions. Algorithms designed in dependence on these known patterns can then be employed to optimize an operating state of the system to minimize the power consumption and/or processing burden while maximizing the likelihood that a desired event is detected in the manner utilizing the most suitable characteristics of the system.

In the following, some illustrative examples are provided. First, a desired event detection is identified that is preferably performed by capturing images at a high frame rate, e.g., in the high power state. Next, various events that typically precede the desired event are identified. Lastly, exemplary logic is described for triggering the high power state at a particular time relative to the identified preceding events to ensure that the desired event is captured utilizing the characteristics of the device components suitable to the desired event (e.g., enhanced imaging). Various considerations are described including potential tradeoffs between power consumption and the likelihood of capturing the desired event at the correct time. These examples are not limited to golf and these exemplary embodiments can be extended to other sports.

Regarding the game of golf, referring to the example provided above, the desired event detection to be performed in the high power state may be the impact between the club and the ball and the launch of the ball. The ball may be launched from any suitable hitting area, including a tee box on a golf course, a hitting bay of a driving range, a hitting surface indoors (e.g., in a golf simulator setting), or an undefined area. Some hitting areas may allow for a preferable position and orientation of the imager, e.g., mounted above the hitting area and oriented straight downward. Some image processing algorithms may be tailored to a particular position/orientation of the imager. However, this is not required and, as would be understood by those skilled in the art, other image processing algorithms may be devised that operate effectively when the imager is positioned/oriented in a variety of different manners, or in any manner, so long as the field of view of the imager clearly covers the hitting surface (specifically, the ball prior to launch) without obstruction.

Some events that typically precede the launch of the ball include: a ball being separated from a group of balls; a ball being moved to a stationary position some minimum distance away from other objects; a ball being mounted on a tee; a golfer holding a club in a certain position relative to a stationary ball (e.g., an approach); a backswing; an apex of a backswing; and a downswing especially when a trajectory of the downswing intersects with the location of the stationary ball. These events may be associated with an approximate timing relative to impact. For example, when the golfer approaches the stationary ball, a launch may be anticipated to occur after some minimum time following the approach (although this amount of time may vary greatly, and in some cases, no launch may result after an approach—i.e., the golfer may move away from the ball after the approach without striking the ball).

In another example, when the system detects that the golfer has started a backswing, a launch may be expected within a predetermined time corresponding to the expected forward swing of the club (varying based on the type of club being swung as described above). When the swing reaches its apex, a launch may be expected in a number of seconds, a single second, or some fraction of a second. When the downswing is detected, a launch may be expected immediately. As indicated earlier this predetermined time may be varied based on historic data concerning the golfer's prior shots, based on a club type detected and based on a position of the club at the furthest point of the back swing (e.g., the point at which the direction of the motion of the golfer's hands begin to reverse or when the direction of motion of the club head reverses).

The high-power state for capturing the launch in one embodiment comprises, e.g., a high frame rate, increased lighting, higher resolution, etc., and is generally triggered only at certain times after certain prerequisite conditions/ events have been detected. For example, when a stationary ball separated from other objects is set as a prerequisite for triggering the high power state the detection of a single ball separated from all of the other balls in an area by at least a predetermined distance). Alternately, the detection of a golfer in a particular pose (the approach) and/or detecting a club in motion near the stationary ball may be set as a prerequisite for triggering the high power state. If a club is detected in a swinging motion, but no stationary ball is in its vicinity, the high power state may not be triggered. As would be understood, the system may alternatively operate to enter the high power state only when a pre-set combination of these conditions is met at the same time.

The system may analyze the movements of people and. when a golfer is detected approaching the ball and positioning him/herself in a swing position, the system may operate to define this as a trigger event that indicates a launch of the golf ball is expected within a predetermined time. However, the system may include information indicating that a time difference between the moment the trigger event is detected and time of the actual launch has a duration of at least a predetermined length of time. When this is the case, the system may delay the transition to the high power state for a time span determined based on this predetermined minimum time (i.e., equal to or less than the predetermined minimum time).

In addition, other power efficiencies may be realized in dependence on this detection. For example, certain image processing algorithms may be executed prior to the approach, while others may be executed only after the golfer's approach has been detected. In this example, ball detection algorithms, club detection algorithms, and/or golfer pose detection algorithms may be executed to detect the golfer in a position near a stationary ball and in a pose indicating of approach to the ball. After this event has been detected, swing-related algorithms may be triggered (i.e., algorithms analyzing images to detect motions indicating that the golfer has begun a backswing in preparation for swinging the club forward to strike the ball). In this case, the system may trigger the high power mode only after certain swing-related detections are made (e.g., backswing, apex, or the beginning of the downswing).

The system can be finely tuned so that the high power state is entered only for a minimum duration of time required to capture the desired data. For example, in one embodiment the high power state can be entered for a time range selected to include only a desired time duration immediately prior to an estimated launch time, continuing through the time of impact and for a specified length of time after impact as required to establish initial launch parameters). Alternatively, depending on the time required to transition to the high power state, certain events may, when detected (e.g., commencement of the downswing), immediately trigger the high power state.

However, in dependence on a known or estimated duration of time from apex to impact (and further in dependence on a processing delay for detecting the event and/or initiating the power state change), the high power state may be entered at an optimal time just prior to impact. If the timing of an upcoming event cannot be predicted with a high degree of accuracy, the high power state may be entered earlier (with more of a buffer time prior to the event that is to be observed) and continued for a longer duration after to the anticipated upcoming event to guarantee that all of the times relevant the event are captured.

Further logic may be implemented in dependence on differing system setups. For example, the imager may not be positioned/oriented in a predetermined location, e.g., the imager may be manually positioned/oriented, and obstructions may be encountered. In some scenarios, the imager may have a field of view covering multiple hitting locations used by multiple golfers. In one illustrative example, the motion of a first golfer closer to the imager may impede event detections for a second golfer farther from the imager. In this case, events detected for the second golfer may, under certain circumstances, trigger the high power state earlier in the swing progression. For example, if an approach is detected for the second golfer and the target ball is clearly viewed, but the actual swing motion is partially obstructed by other objects (e.g., as the first golfer moves around the hitting location), the high power state may be entered some minimum time after the approach of the second golfer is detected, even if the actual swing has not been detected.

In some embodiments, the system is designed to detect events and impacts of multiple golfers at different locations. For example, the imager may be positioned between two hitting bays such that a first half of an image comprises a first hitting bay and a second half of the image comprises a second hitting bay so that objects may be detected and tracked by the system simultaneously as they are launched from both hitting bays. If an upcoming launch is anticipated for a first one of the golfers in a first hitting bay, the imager may be temporarily entered into the high power state while devoting its resources to detecting this launch, while the second golfer is temporarily ignored. In practical terms, the system may define a region of interest around the ball in the first hitting bay excluding analysis of activity in the second hitting bay. After the launch from the first hitting bay has been detected, the imager may then resume object tracking for both hitting bays until another trigger event is detected indicating that a launch is anticipated in one or both of the hitting bays.

Thus, although various examples of the present disclosure are described with regard to an imager positioned above a single hitting area oriented straight down, those skilled in the art will understand that different positions/orientations of the imager can be used in conjunctions with different arrangements from which ball launches are anticipated.

It is further noted that the high power state may be desirable for different types of detections in the game of golf other than initial impact/launch. For example, it may be desired to detect and determine parameters regarding a bounce, e.g., the impact of the ball with a surface after flight. In this example, a prerequisite condition prior to entering the high power state may be detected based on tracking data for the flight of the ball that indicates impact of the ball with the ground is imminent. For example, the system may track the trajectory of the ball (e.g., using any tracking device such as an optical or radar-based tracking system) in conjunction with data detecting the geometry of the landscape into which the ball has been launched and/or utilizing stored information concerning the geography of the area within which the ball will land and predict a time and location at which the ball will land. In dependence on this information, the system may transition the imager into the high power state just prior to the anticipated landing time. In this example, the imager may be located adjacent to a putting surface (e.g., the green) including a target pin or facing any other location at which incoming shots are anticipated to land.

It should be understood that the exemplary embodiments are described with regard to operations performed using images from a single imager. However, there are scenarios where it may be beneficial to use further imagers and/or other sensors to detect the prerequisite events implying an anticipated upcoming event. In one example, the imager capable of the high power state may cover multiple hitting areas at a driving range. Other sensors may be employed to detect any of the described trigger events that indicate that an event that is desired to be observed is imminent (e.g., by tracking the position and/or movement of a ball, a club or golfer or by tracking the pose of a golfer and/or the orientation of a moving club) and this information may be used to control the entry into the high power state and the exiting of the system from the high power state. When the launch or any other event to be observed is determined to be imminent, the imager capable of the high power imaging may be triggered to enter the high power mode and focused on an area of interest in which the event is anticipated to occur.

Regarding the game of baseball, the desired event detection to be performed in the high power state may be the release of the pitch or the impact of the bat with the ball. Similar to the golf scenarios above, pitches in baseball are thrown from a well-defined pitching area, e.g., a mound on the field of play or in a practice setup with a pitching rubber (pitcher's plate). The system may use as a priori knowledge to establish a region/regions of interest (e.g., using the fact that the rules of baseball require a pitcher to maintain a foot in contact with the pitching rubber when beginning the wind-up that precedes every pitch and that the ball can be batted only by a batter standing in a predefined batter's box on the field of play) or when a user designates a region of interest (e.g., in a practice setup adjacent to a home plate toward which the pitches are aimed). Some pitching/hitting areas may allow for a preferable position and orientation of the imager, e.g., mounted above the pitching/hitting area and oriented straight downward, however, this is not required. Thus, for systems seeking to observe the release of a pitched ball and/or the impact of the pitched ball with a bat, this a priori knowledge can significantly reduce the portions of the image that need to be analyzed correspondingly reducing the volume of calculation required to analyze images produced by the system.

Some events that typically precede the pitch of a ball include: a pitcher entering a pitching pose (when the pitcher is "set") in contact with the pitching rubber; an initial portion of a pitching motion (stepping back, raising the leg); a drawback of the pitcher's arm; and a forward motion of the pitcher's arm. These events may be associated with an approximate timing relative to the release of the pitch and/or when the pitch will reach a location at which it may be hit by a batter. When the pitcher's foot is in contact with the pitching rubber and the beginning of a windup is detected, a pitch may be expected within a short time (varying in dependence on the individual pitcher's pitching motion). Thus, when this windup is detected an initial value for the time until release of the pitch may be employed and this value may then be modified, if desired, based on historic data (e.g., including prior pitches during this same game, pitching session or from any time in the pitcher's past performance).

As would be understood by those skilled in the art, the system may detect when a pitcher is using a complete windup (generally with no runners on base) or pitching from the stretch and separate values for an expected time from windup detection to pitch release may be used for these situations. Alternatively, the system may first detect the start of the windup and after this detection, detect the beginning of a forward motion of the pitcher's pitching arm as this will indicate a shorter and more predictable time until pitch release. In short, the system may detect the start of a windup and use this as a trigger event to start a countdown of a predetermined duration until the switch of the system to the high power mode (i.e., a countdown to a time that is predicted to precede the event to be observed by a desired buffer amount).

In the case of detection of contact between the ball and the bat, this time value would be generally equal to the time determined as remaining until pitch release plus a travel time of the pitched ball to an area in which the ball will be in reach of the batter. The system may switch to the high power mode prior to the release of the pitched ball (if this is an event that it is desired to observe) or the system may delay the switch to high power mode by an additional time generally equal to a predicted travel time of the ball from the location at which the pitch is released until it enters a zone within which it may be hit if the hitting of the ball is the only event that is desired to be observed.

If both events are desired to be observed in the high power mode, the system may enter the high power mode immediately prior to pitch release and exit the high power mode after the ball has been hit or has passed home plate) or has passed an area at which the batter is stationed. The high-power state for capturing the pitch may comprise, e.g., a high frame rate, increased lighting, higher resolution, etc. Some events that may typically precede the hitting of the ball with a bat include: the batter getting set in a batting position; the release of a pitch; the batter lifting a leg or otherwise preparing to swing; and the swing of the bat. As indicated above, the system may decline to enter the high power mode even when the ball approaches the hitting zone (the area within which the ball is within reach of the batter) if, at the same time, motions indicative of the beginning of a swing are not detected.

Similar to the golf-related examples described above, some event detections may imply an anticipated upcoming event but may not immediately trigger the high power state. Various pose detection algorithms or arm/bat motion algorithms for the pitcher or hitter can be used to trigger the high power state at desired times.

Regarding the game of football (soccer), the desired event detection to be performed in the high power state may be the striking of the ball by a kicker. The ball may be kicked from any suitable launch area, e.g., a position of a free kick or a penalty kick. Some kicking areas may allow for a preferable position and orientation of the imager, e.g., mounted above the kicking area and oriented straight downward, however, this is not required.

Some events that may typically precede the kick of a ball include: a ball being moved to a stationary position some minimum distance away from other objects; a kicker being positioned some minimum distance or maximum distance away from the stationary ball; the kicker approaching the stationary ball; and the kicker's leg drawing back to kick.

Similar to the examples described above, some event detections may imply an anticipated upcoming event but may not immediately trigger the high power state. Various pose detection algorithms for the kicker or motion detection algorithms for the kicker's leg can be used to trigger the high power state at a desired time.

Regarding the game of American football, the desired event detection to be performed in the high power state may be the striking of the ball by a kicker, e.g., for a field goal or a punt. The ball may be kicked from any suitable launch area, e.g., a position of a field goal. Some kicking areas may allow for a preferable position and orientation of the imager, e.g., mounted above the kicking area and oriented straight downward. Some image processing algorithms may be tailored to a particular position/orientation of the imager, however, this is not required.

Some events that may typically precede the kick of a football include: a ball being moved to a stationary position and held upright, e.g., by a device or by a player; a kicker being positioned some minimum distance or maximum distance away from the stationary ball; the kicker approaching the stationary ball; and the kicker's leg drawing back to kick.

Similar to the examples described above, some event detections may imply an anticipated upcoming event but may not immediately trigger the high power state. Various pose detection algorithms for the kicker or motion detection algorithms for the kicker's leg can be used to trigger the high power state at a desired time.

Regarding the game of tennis, the desired event to be observed in the high power state may be the striking of the ball by a racket. The ball may be struck from any area within the court and the area surrounding the court, but, as would be understood by those skilled in the art, the service of the ball and the initial return of serve generally occur in more predictable areas that may be targeted by the system in the same manner described above. In addition, by tracking the movements of the players and the ball, the location of virtually every shot can be predicted to shrink the region of interest to reduce the computational burden on the system in the same manner described above. Depending on the construction of the structures surrounding the court, preferable positions and orientations for one or more imagers may be selected (e.g., mounted above the hitting area and oriented straight downward or elevated behind one or both ends of the court aimed downward to the court). Image processing algorithms may, if desired, be tailored to the particular position/orientation of the imager selected for each situation.

Some events that may typically precede the serve of a tennis ball include: a player being set in a serve position; a ball being thrown upward; the hitter drawing the racket back; and the hitter swinging the racket forward. Each or all of these actions may be detected to determine a time before the event to be observed (e.g., striking the ball with the racket for service) so that the high power mode may be entered prior to the occurrence of the event to be observed (e.g., high power mode set to be entered with a predetermined buffer time prior to the expected time of the event).

Similar to the examples described above, some event detections may imply an anticipated upcoming event but may not immediately trigger the high power state. Various pose detection algorithms for the tennis player or motion detection algorithms for the player's arm or racket may be used to trigger the high power state only at a desired time (i.e., to minimize time in high power mode during which actions relevant to the event to be observed are not occurring).

Regarding the game of volleyball, the desired event detection to be performed in the high power state may be the striking of the ball by a volleyball player. For service, the ball may be struck from a predictable area, e.g., behind the serving line, so that the size of the region of interest may be reduced to minimize the consumption of computational resources. For all other shots, tracking of the ball and the players makes it possible to determine a likely location for a shot in the same manner described above for tennis. Depending on the construction of the structures surrounding the court, preferable positions and orientations for one or more imagers may be selected (e.g., mounted above the hitting area and oriented straight downward or elevated behind one or both ends of the court aimed downward to the court). Image processing algorithms may, if desired, be tailored to the particular position/orientation of the imager selected for each situation.

Some events that may typically precede the serve of a volleyball include: a player being set in a serve position; a ball being thrown upward; the hitter drawing their arm back; and the hitter swinging their arm forward and then any time the path of the ball comes within arm's length of any player (e.g., in combination with either of the player's arms moving to a position relevant to setting up to hit).

Similar to the examples described above, some event detections may imply an anticipated upcoming event but may not immediately trigger the high power state. Various pose detection algorithms for the volleyball players or motion detection algorithms for players' arms may be used to trigger the high power state only at a desired time (i.e., to minimize time in high power mode during which actions relevant to the event to be observed are not occurring).

It is noted that certain detections may be possible with an extremely low frame rate, resolution, lighting, etc. Obviously, the accuracy and quality of these detections may be improved with higher frame rates. However, if the accuracy can be adequately guaranteed with certain operating parameters for the imager less resource dependent than those of the high power mode, these operating parameters may be used in scenarios where, e.g., the CPU resources are limited.

Different event detection processes and/or parameter determinations can be associated with different processing burdens and a duration over which that processing burden may be imposed. Some processes may be run continuously—e.g., some object detections. Other processes may be run only when certain prerequisite events are first detected, e.g., a ball detected to be moving causes various swing-related event detection processes to be run.

Certain operations may be available only for computing devices having certain operating capabilities. The system software may detect the capabilities of the camera and the capabilities of the CPU and allow for the calculation of different events/parameters based thereon. E.g., if the camera is limited but the CPU is powerful, many basic event detection algorithms could potentially be performed in tandem. Conversely, if the camera is powerful but the CPU is limited, complex processes using e.g., high resolution/high framerate may be performed only in the most highly prioritized scenarios and the determination as to the parameters that dictate when the high speed mode is entered may be varied based on current operating conditions of the CPU.

In some embodiments, certain modules of the processing apparatus may be devoted to different tasks that require varying amounts of processing power. For example, one module can be devoted to object detections and can run continuously. Another module can be devoted to motion detection and can run continuously. Other modules can be devoted to event detection and can be run, for example, only when prerequisite conditions are met and indications of such conditions are received from the modules that were already running. Each of the modules may have some known processing/power consumption, and some can be activated only under certain conditions, e.g., when the system is not at risk of overheating.

Figure 6:
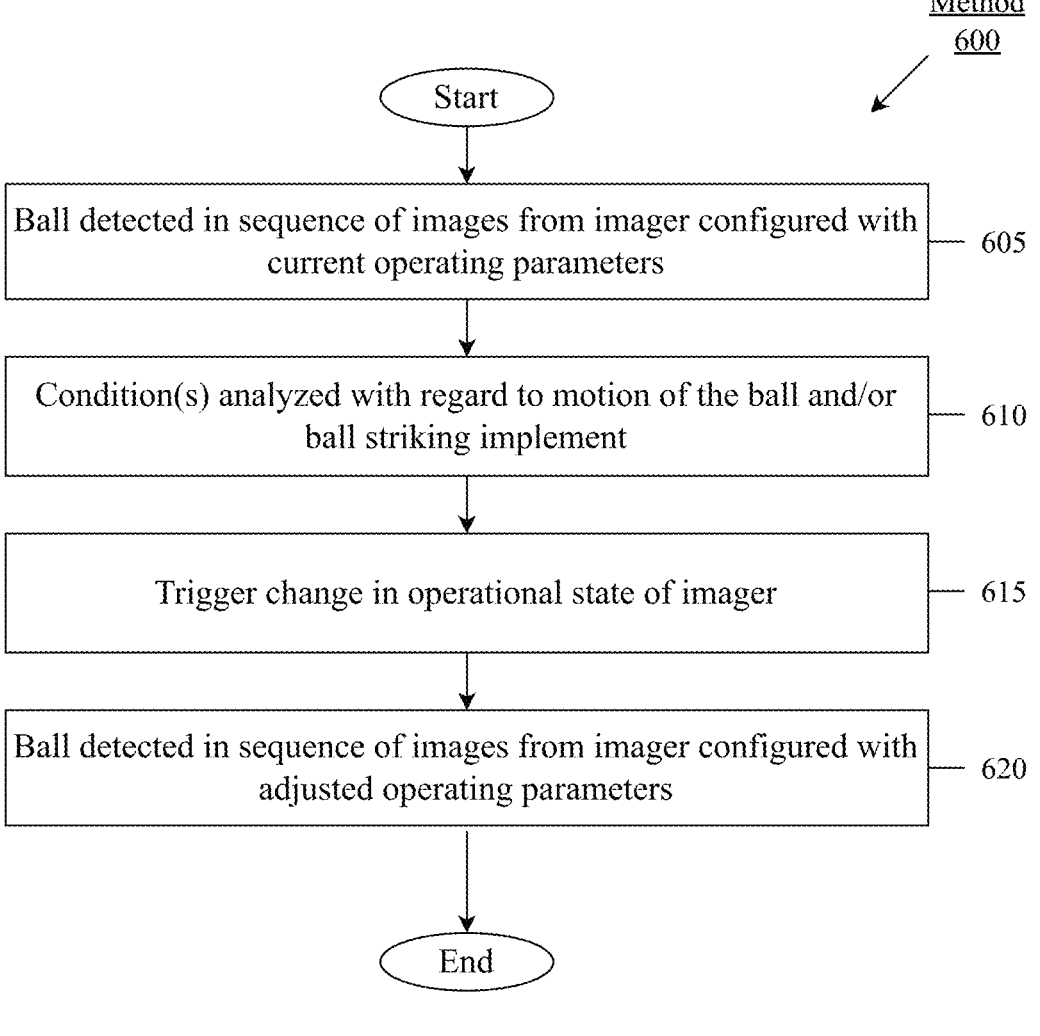
FIG. 6 shows a method for triggering a change in an operational state of an imager according to various exemplary embodiments.

FIG. 6 shows a method 600 for triggering a change in an operational state of an imager according to various exemplary embodiments.

In 605, a ball is detected in a sequence of images captured by the imager. The imager may be configured with current operating parameters. In some embodiments, the ball may be a golf ball. In other embodiments, the ball may be another type of sports ball, as described above. The current operating parameters may comprise a low power state in which the imager captures images at a low frame rate, with low resolution, or with other relaxed parameters. The ball can be detected by implementing various types of ball detection algorithms. Further detections may also be performed, e.g., club detections. In some embodiments, the ball detection may be a prerequisite condition to performing further image processing analyses, e.g., club detections.

In 610, one or more conditions are analyzed with regard to motion of the ball and/or a ball striking implement. Initial conditions can comprise, e.g., a single ball being separated some distance from other objects (such as a group of balls); the separate ball being stationary; a club being detected in a frame; and/or a club being detected within a predetermined distance of the stationary ball. When these one or more prerequisite conditions are satisfied, further conditions can be analyzed such as, e.g., an approach or a swing. The thresholds used in satisfying these conditions may vary based on a classification of a club type.

In 615, when the one or more conditions are satisfied, a change is triggered in the operational state of the imager. For example, the conditions may indicate that a launch of the ball is upcoming. In some embodiments, the operational state of the imager may be triggered to transition from the low power state to a high power state. The high power state may include operating parameters such as a frame rate, a resolution, etc. that are increased relative to the low power state.

In 620, the ball is detected in a further sequence of images captured by the imager with adjusted operational parameters. For example, the launch of the ball may be captured in high detail and with a number of images spaced very closely in time. These images may be processed in a variety of ways to derive desired launch parameters.

In some embodiments, the desired launch parameters include spin parameters including a three-dimensional spin rate and spin axis. Current techniques for analyzing ball motion in sports using a single imager are typically limited to measuring the velocity vector and speed of a moving ball. According to the present techniques to be described in detail below, a system can retrieve the full 3D rotation vector in a sport ball shot by resorting only to a few images acquired by a single camera.

In another aspect of these exemplary embodiments, methods are described for the calculation of spin parameters for a spinning spherical ball. In these embodiments, a full three-dimensional (3D) rotation vector of a moving spinning spherical sports ball is measured by resorting to images acquired by only a single camera. Some aspects of these embodiments are described with regard to golf; however, these methods can be applied to many possible sports including, e.g., baseball, tennis, football, volleyball, etc.

The methods described herein calculate the 3D Spin Axis (SA) of a moving ball by observing only a small part of a shot trajectory, e.g., at launch. Although it is designed to take advantage of the availability of a decent number of frames (for instance, the first 15-30 in the shot), the algorithm can also be executed based on two frames. The algorithm is based on the estimation of the pixel displacement between consecutive frames in the pixels belonging to the ball.

The knowledge of the 3D rotation vector is important in several applications. For example, if the 3D rotation vector is estimated using only the first few frames available in a sport ball shot, this information can be used together with the knowledge of launch angle, launch direction and ball speed, to provide the full trajectory of the ball. This would be important in several applications, such as golf simulators, golf training, football training, tennis training, etc.

For these kinds of applications, it is desirable to provide an output within less than 0.5 seconds by running in a normal hardware, such as a standard commercially available laptop. For this reason, the algorithm described in the document has been developed to run quasi-real time.

The algorithm for the estimation of the 3D SA may be referred to as the Ball Tracker (BT). Within this framework, the method can be used to analyze either optical (RGB) or infrared (IR) images, either 3 channels or 1 channel.

The BT works with optical or infrared images acquired within a moving spinning sport ball, and it provides the 3D SA measurement. It is based on finding, for every pixel belonging to the ball, the exact displacement of the same pixel between consecutive frames. This is done by resorting to the estimation of the Dense Optical Flow (DOF), a vector field describing the pixel movement for every pixel in two input images. It is based on recognition and tracking of every recognizable feature in the ball surface. For example, in the case of a golf ball, this could be the label of the ball or the dimples on the ball surface. Within this context, it is very important to have high resolution images acquired at a reasonably high video rate, and with a fairly low exposure time.

The main requirement is dictated by the maximum Spin Rate (SR) which can be observed. Given that the algorithm relies on the estimation of the pixel displacement, it is important that some of the same ball features will be observable in two consecutive frames. To guarantee this, a feature that appears at the edge of the ball in the first frame can at maximum be at the center of the ball in next frame.

For example, the shots that can be observed in golf are considered. Based on golf literature, it is shown that an average of a few thousands RPM (revolutions per minute) is typical for a golf shot, although this varies based on the type of club used. It is difficult to find examples of shots over 10000 RPM. Therefore, a conservative threshold of 15000 RPM can be used. With this maximum, the images would need to be acquired at a video rate greater than or equal to 1500 fps.

It may be preferable for 3-4 full revolutions of the ball to be available, which corresponds to a number of frames which is typically between 15 and 30. However, the lowest threshold for the algorithm is just 2 images. Additionally, the resolution of the images should be sufficient to correctly track the features in the ball, e.g., images where the ball has a radius equal to or greater than 25 pixels. The images can be calibrated. Given the knowledge of the ball radius in meters, the (u, v) sensor coordinates can be converted into (x, y, z) real coordinates.

Figure 7:
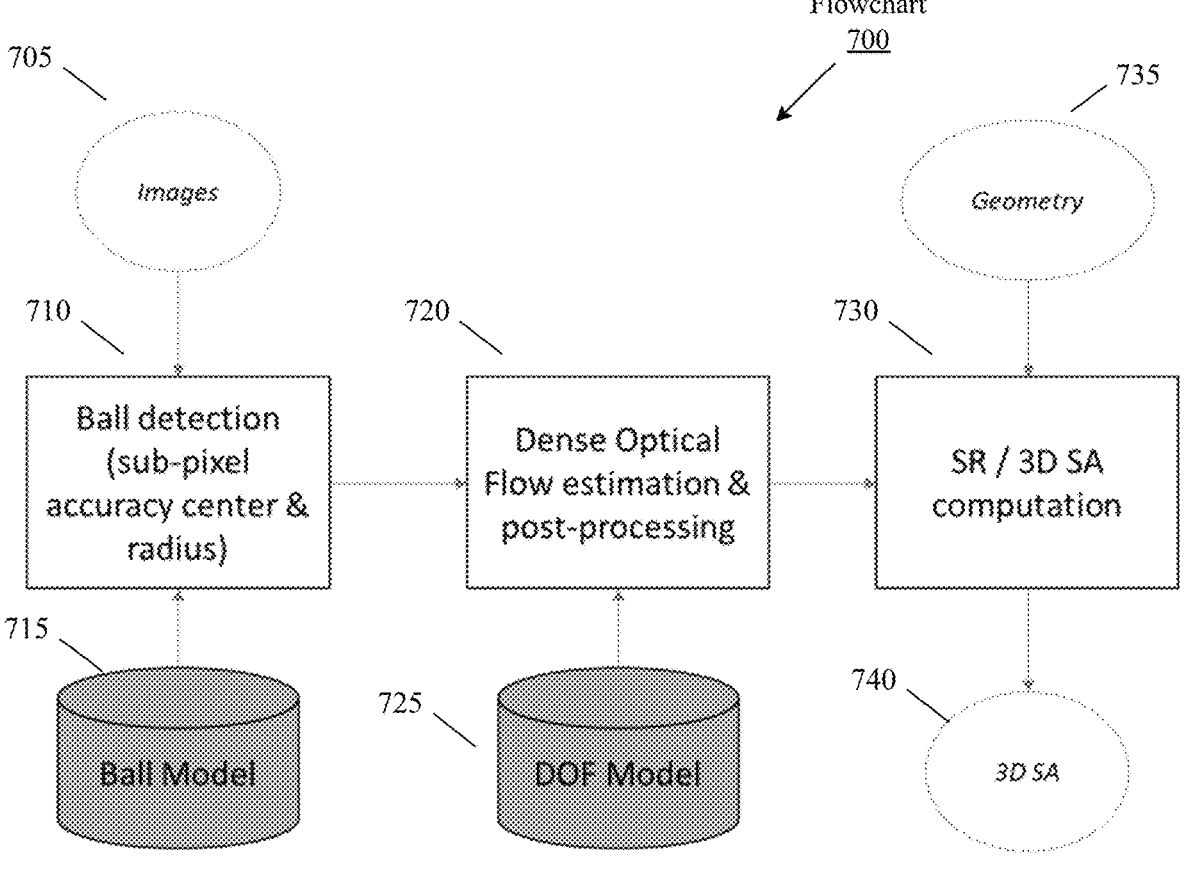
FIG. 7 shows a method for calculating the 3D spin axis (SA) of a moving sports ball from a sequence of images from a single imager according to various exemplary embodiments.

FIG. 7 shows a flowchart 700 for calculating the 3D spin axis (SA) of a moving sports ball from a sequence of images from a single imager according to various exemplary embodiments. In the flowchart 700, algorithmic operations are depicted by boxes delimited by continuous lines, while algorithmic inputs and intermediate outputs are depicted by boxes delimited by dotted lines and Deep Learning (DL) models are depicted by cylindrical boxes. The flowchart 700 provides an overview of the ball tracker (BT) operations, while various aspects of the flowchart 700 are described in greater detail below with regard to FIGS. 8-11.

In 705, a set of 'n' images are received as input. The set includes at least 2 images (n=2), however, the accuracy of the SA estimation can be improved with additional images, e.g., n=15-30. The set of images can comprise consecutive images captured at a high frame rate, e.g., X fps. The images can show the launch of the ball. The images should show the ball in motion.

In 710, for all input images, a ball detection algorithm is executed. The ball detection algorithm is executed in view of a DL ball model 715, to be described in greater detail below with regard to FIG. 10. In a first step, the ball detection algorithm retrieves a very accurate pixel and radius measure of the ball. In a second step, new crops of the input images are generated in which the ball is always in the same position with the same size.

In 720, a dense optical flow (DOF) is estimated for every two consecutive images. Thus, if two input images are used, one DOF is estimated. For a set of 'n' input images, n−1 DOFs are estimated. The DOF(s) are estimated in view of a DL DOF model 725, to be described in greater detail below with regard to FIG. 8. These n−1 DOFs are then post-processed, to be described in greater detail below with regard to FIG. 9.

In 730, the post-processed DOF(s) are analyzed to compute the 3D rotation vector, including the spin rate (SR) and spin axis (SA), of the ball. The 3D rotation vector is computed in view of the geometry 735 of the scene, including knowledge of the camera and ball positions. In 740, the 3D spin axis is output for display to a user.

According to one aspect of these exemplary embodiments, the procedure is described for retrieving the DOF from an input pair of consecutive images describing a moving spinning sports ball.

Figure 8:
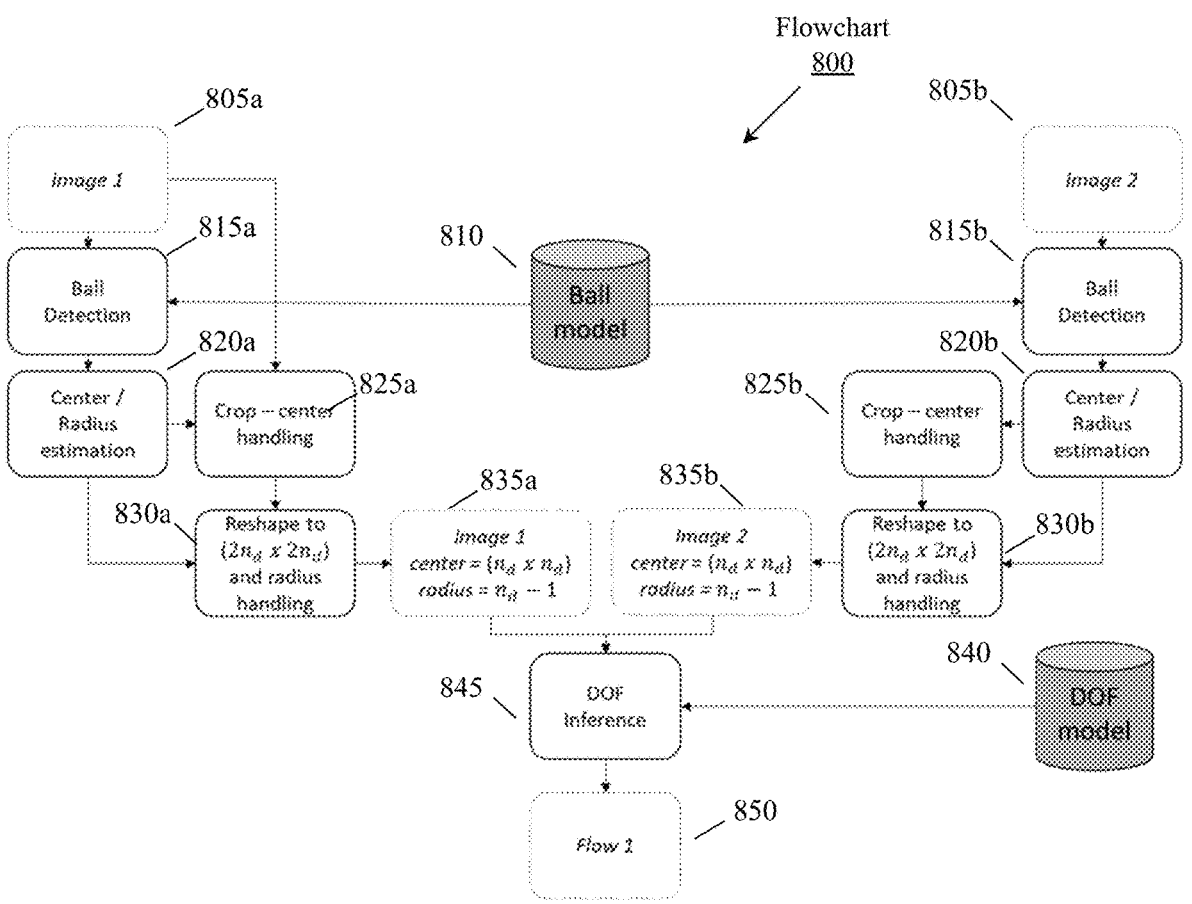
FIG. 8 shows a method for computing a dense optical flow (DOF) for an input pair of consecutive images describing a moving spinning sports ball according to various exemplary embodiments.
Figure 9:
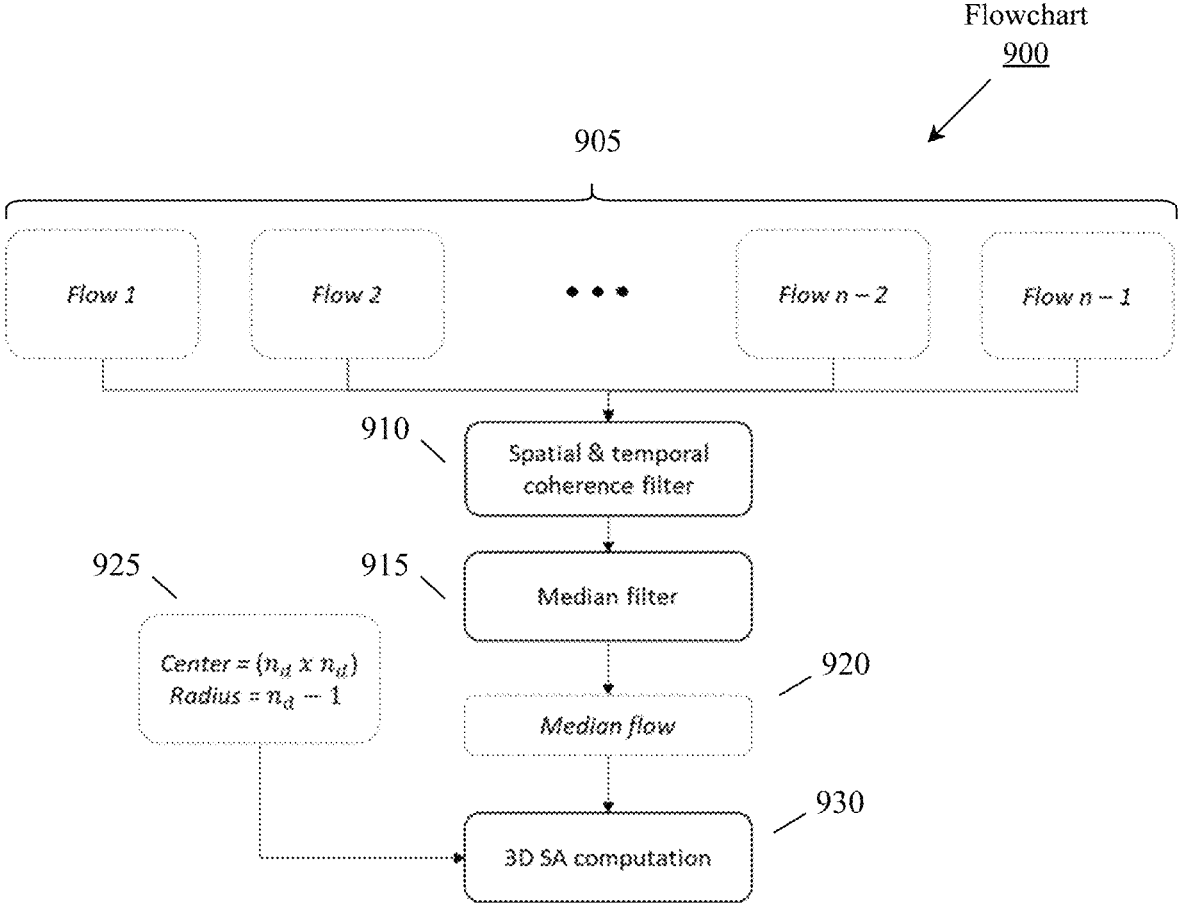
FIG. 9 shows a method for computing a three-dimensional (3D) spin axis from dense optical flow (DOF) for an input pair of consecutive images describing a moving spinning sports ball according to various exemplary embodiments.

FIG. 8 shows a flowchart 800 for computing a dense optical flow (DOF) for an input pair of consecutive images describing a moving spinning sports ball according to various exemplary embodiments. FIG. 9 shows a flowchart 900 for computing a three-dimensional (3D) spin axis from dense optical flow (DOF) for an input pair of consecutive images describing a moving spinning sports ball according to various exemplary embodiments. Similar to the flowchart 700, algorithmic operations are depicted by boxes delimited by continuous lines, while algorithmic inputs and intermediate outputs are depicted by boxes delimited by dotted lines and Deep Learning (DL) models are depicted by cylindrical boxes. The algorithmic steps are described in general as follows, and a more detailed description is provided further below.

A pair of images, e.g., a first image 805a and a second image 805b, are received. A ball model 810 is implemented in ball detection operations, e.g., ball detections for the first and second images 805a, 805b. Parameters for the ball including a center and a radius for the ball are estimated for the first and second balls in 820a, 820b. These parameters are used to determine a crop 825a-b for the first and second images. The ball is at the center of the cropped images. The cropped images are then reshaped 830a, b to a predetermined pixel size and the radius is calculated. From these image processing steps, first and second modified images 835a, 835b are generated having a center=(nd×nd) and a radius of nd−1. A dense optical flow (DOF) model 840 is implemented in a DOF inferencing 845. A first flow 850 is output.

The DOF inferencing 845 can be performed for all pairs of consecutive images. For example, if a third image is received after the second image, the DOF inferencing 845 can be performed for the second and third images. In a set of n consecutive images captured of the spinning sports ball, n−1 flows can be generated.

With regard to FIG. 9, in 905, a number of flows 905 are received, e.g., n−1 flows. In 910, a spatial and temporal coherence filter is applied. In 915, a median filter is applied. A median flow 920 is generated. Based on the ball properties 925 for the median flow, in 930 the 3D SA is computed.

The algorithmic steps described above rely on DOF estimation, as described above in FIG. 8. For a pair of images, the DOF estimation provides information regarding the shift along "u" and "v" axes of each pixel from the first image to the second image. The DOF map contains information which allows the measurement of the SR and 3D SA of a rotating ball.

If a DOF map is computed from a video in which the ball is moving, the DOF would typically also provide information about the translational movement of the ball. To remove this trajectory information from the analysis and generate a DOF describing only the rotation of the ball, the images are initially reshaped in a pre-processing operation, referring to the operations 830a, b described above with regard to FIG. 8. The pair of reshaped images, e.g., first and second images 835a, 835b, have equivalent centers and radii for the balls. This can be done if a very accurate (with sub-pixel accuracy) ball detection is previously performed. This is done by resorting to a DL based Ball Detector, referring to the operations 815a, b described above.

The subpixel accurate center and radius are used to crop and reshape all the available input images. The crops will have size of $(2n_d \times 2n_d)$, and all the crops will have a ball exactly centered in the pixel $(n_d \times n_d)$ and with radius $n_d-1$.

Here, $n_d$ determines the pixel dimension of the window in which the following DOF method works. Bigger windows can be used to achieve better performance, while smaller windows can be used to achieve faster inference. As a trade-off, $n_d=64$ can be used, but bigger or smaller values can be used as well. Additional information on the affine transformation used to crop and reshape the input images is provided below.

The DL algorithm called VCN (Volumetric Correspondence Networks) can be used for DOF estimation. Other DL algorithms such as LiteFlowNet or RAFT can also be used. Only a fairly accurate estimation of the pixel displacement of the pixels in the input images is needed. A more important part is the DL DOF model training, referring to operation 840 described above in FIG. 8 and to be described in greater detail below.

The ball detection algorithm can be implemented as, for example, an Object Detection DL based method, such as the classical SSD or the latest Yolo. Such algorithms can be applied to ball sports. The ball detection algorithm can also be based on a Segmentation Network, one example of which is provided below. However, various ball detectors can be used that have a suitable accuracy.

According to one example, a hybrid between the two well-known architectures UNET and VNET can be used. This architecture may be referred to as DeepVOG.

Figure 10:
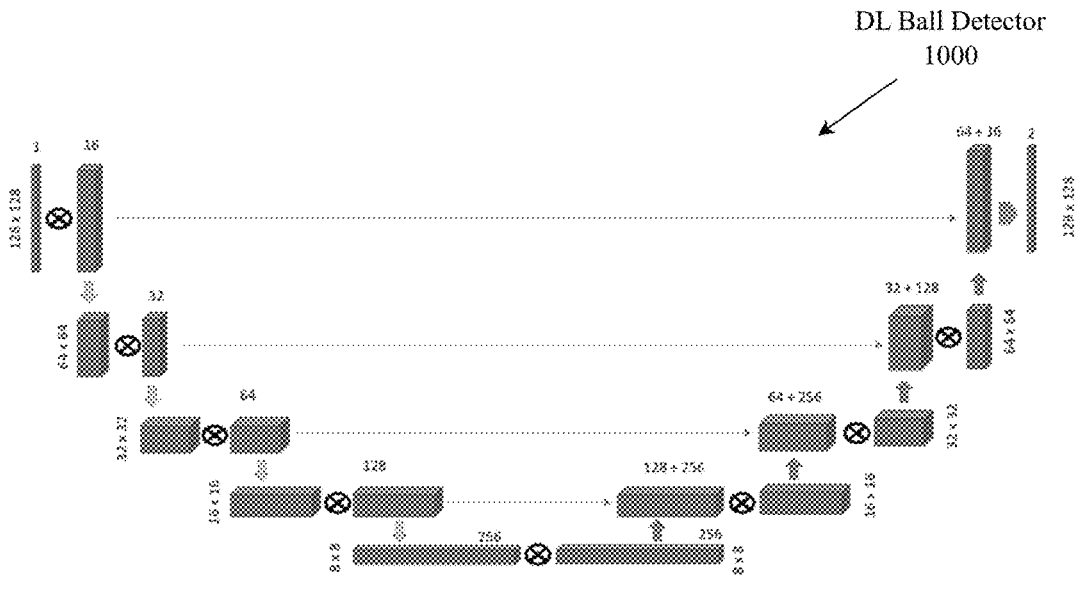
FIG. 10 shows an example of an implementation of the DeepVOG architecture 1000 according to various exemplary embodiments.

FIG. 10 shows an example of an implementation of the DeepVOG architecture 1000 according to various exemplary embodiments. In this example, the input is a 128×128 pixel monochromatic image (1 input channel) and 16 intermediate channels are used. In this implementation, the segmentation network provides as an output a 128×128 two-channels image, in which every pixel of the two channels describes the probability of that pixel to belong to the "background" class or the "ball" class. In the architecture 1000 shown in FIG. 10, the convolution symbol indicates a fully convolutional layer; the arrows pointing down indicate down-sampling layers; the arrows pointing up indicate up-sampling layers; and the horizontal lines indicate concatenation along channels layers. For every block, the number of rows and columns is indicated on the side, while the number of channels is indicated on the top.

Providing to have centers coordinates ($c_x$, $c_y$) and radius r estimates, taking the crop of the ball would be very simply provided by the floor integer representation of those estimates, ($\lfloor c_x \rfloor$, $\lfloor c_y \rfloor$) and $\lfloor r \rfloor$. For example, we could take the crop by considering the image from $\lfloor c_x \rfloor - \lfloor r \rfloor$ to $\lfloor c_x \rfloor + \lfloor r \rfloor$, and from $\lfloor c_y \rfloor - \lfloor r \rfloor$ to $\lfloor c_y \rfloor + \lfloor r \rfloor$.

Anyway, it is desirable that the DOF map estimated by the algorithm represents only the rotation of the ball. To this purpose, it is very important that all the images are centered in the exact center of the ball. It is also very important that the ball dimensions do not change among the images.

Of course, in the original images, if the ball is moving, its apparent size will slightly change from frame to frame, due to the change in the distance from the camera. To solve the issue of centering the crop exactly in the float estimate of the center, an affine transformation can be used. The algorithm takes a slightly bigger crop C1 with coordinates as: C1: $x \in [\lfloor c_x \rfloor - \lfloor r \rfloor - 1, \ \lfloor c_x \rfloor + \lfloor r \rfloor + 1]$, $y \in [\lfloor c_y \rfloor - \lfloor r \rfloor - 1, \ \lfloor c_y \rfloor + \lfloor r \rfloor + 1]$. Then a new crop C2 can be centered in the actual center ($c_x$, $c_y$) by applying the affine transformation to C1 defined by the matrix A:

$$A = \begin{bmatrix} 1 & 0 & c_x - \lfloor c_x \rfloor \\ 0 & 1 & c_y - \lfloor c_y \rfloor \end{bmatrix}.$$

The crop C2 will be then reshaped to a $2n_d \times 2n_d$ crop. In this crop, the new corresponding dimension of the radius is computed as: $r_2 = r*2n_d/(2*(r+1))$. C2 is perfectly centered in the center of the image. The radius though can still be different from frame to frame. To compensate this, C2 is cropped, by evaluating it from $n_d - r_2$ to $n_d + r_2$ through performing a new affine transformation and obtaining thus a slightly smaller crop C3. The new resulting crop C3 is then reshaped again into a ($2n_d \times 2n_d$) pixels window. In this way, after this final operation, ideally in C3 the ball is centered exactly in ($n_d$, $n_d$), and the radius is exactly $n_d - 1$ pixels. The accuracy of the position of the center and the radius in the final crop only depends on the accuracy of the estimates of center and radius in the initial image.

Figure 11:
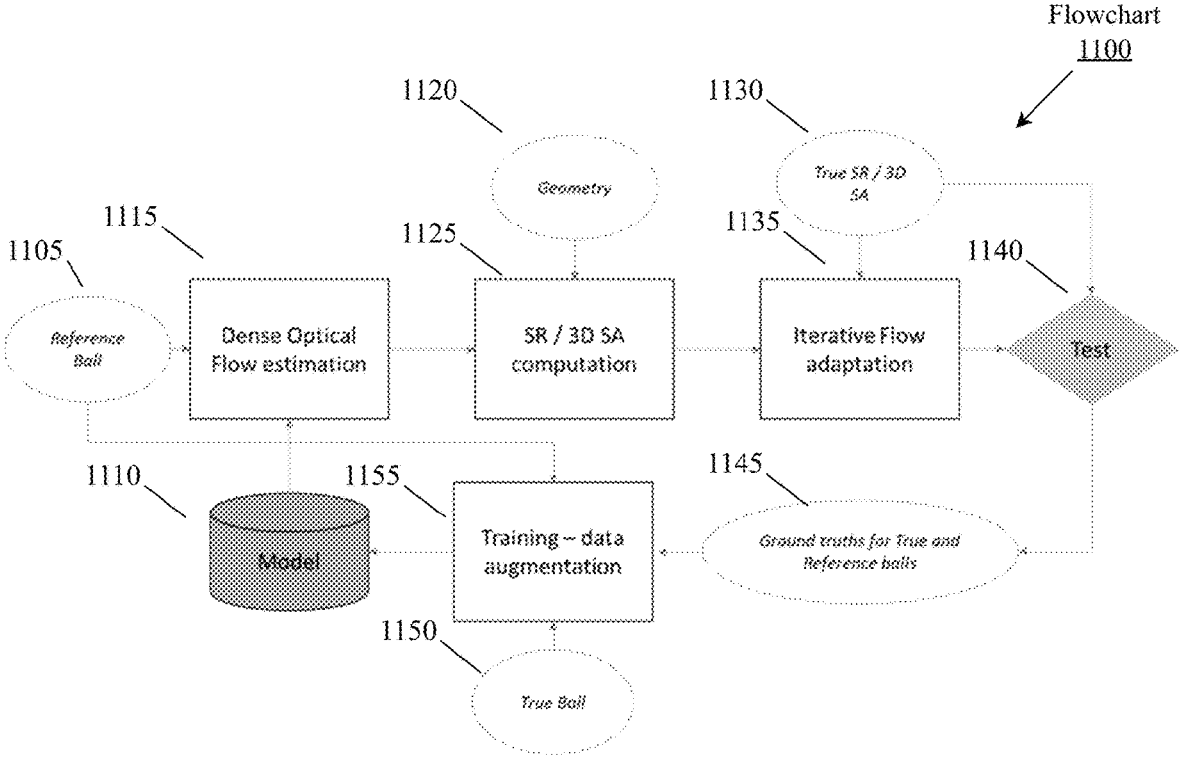
FIG. 11 shows a method for training a deep learning (DL) dense optical flow (DOF) model according to various exemplary embodiments.

FIG. 11 shows a flowchart 1100 for training a deep learning (DL) dense optical flow (DOF) model according to various exemplary embodiments. This training may rely on the availability of simulated images of several shots. The simulations may be generated using a software program such as Blender or CAD. The simulations are created using a "Reference Ball" and a "True Ball". Namely, the Reference Ball is a ball with very well recognizable features and patterns, which can be more easily tracked by any DOF algorithm, while the True Ball is a much more realistic sports ball. The same shot, with the same launch parameters (such as ball speed, launch angle and launch direction) and the same 3D SA vector, is repeated in the simulator twice, the first time using the Reference Ball, the second time using the True Ball. It is reasonable that the current available model will be more accurate to provide a good estimate of the DOF on the Reference Ball. Images 1105 of a reference ball are input and a DOF model 1110 (e.g., untrained) is implemented in a first dense optical flow estimation 1115. The geometry 1120 of the scene is used for the computation of the 3D spin parameters 1125. The true 3D spin parameters 1130 are used in an iterative flow adaptation 1135 and a test 1140 is run to determine ground truths 1145 for the true ball and the reference ball. The true ball parameters 1150 and the ground truths 1145 are used to determine a data augmentation 1155 for training the DOF model 1110. With the trained DOF model 1110, the DOF analysis described in FIG. 8 can be performed.

FIG. 9 shows the post-processing algorithm applied to the n−1 available DOFs, to retrieve an unique DOF for the shot and use it to retrieve the 3D SA by applying the formulas described below.

In 905, the spatial and temporal coherence of the available DOFs is analyzed.

Every pair of input images should be characterized by a DOF which is spatially coherent. That is, the variation of the magnitude and the direction of the pixel displacements should not vary too much between one pixel and its neighbors. If that is not the case, when significant changes are detected between the pixel displacement among some pixel neighborhoods, then the DOF is classified as non-spatially coherent and filtered out for the 3D SA computation.

The same principle can be applied for the time direction. Every pixel displacement should be characterized by small variations between one couple of input images, and the next couple of input images. When this is not the case, the two consecutive DOFs are assigned as non-temporal coherent and filtered out.

After filtering out the DOFs by using spatial and temporal coherence analysis, the instantaneous 3D ball positions are used to compute the median DOF. In fact, providing that the images have been reshaped and recentered in new crops, the DOF is a function of the 3D SA of the ball. Anyway, it's also a function of the original position of the ball in the image. That is, the same rotation is seen differently from the camera according to the position occupied by the ball, because of the projection. Thus, the temporal median of the DOFs is performed by taking the projection into account.

As a result of the temporal median filter, the output is just one DOF. The 3D SA formulas are computed only once, only on one DOF (the median). However, this is not the only possible way to achieve the result. The 3D SA can be computed on each available DOF, and only after that the median on the resulting 3D SAs can be evaluated. It is possible to not evaluate the median at all and provide the instantaneous measure of the 3D SA for each input frame. Even the median filter could be substituted by an average, or a weighted average. In the context of the BT, the median filter can be used to obtain an acceptable trade-off between performance and the algorithm's computational load so that the BT is able to run quasi real-time. More complexes operations are possible in a different hardware, or if the algorithm can use more time to provide an output. The computation of the 3D SA from a DOF can resort on classical linear algebra techniques, such as Singular Value Decomposition (SVD).

Figure 12:
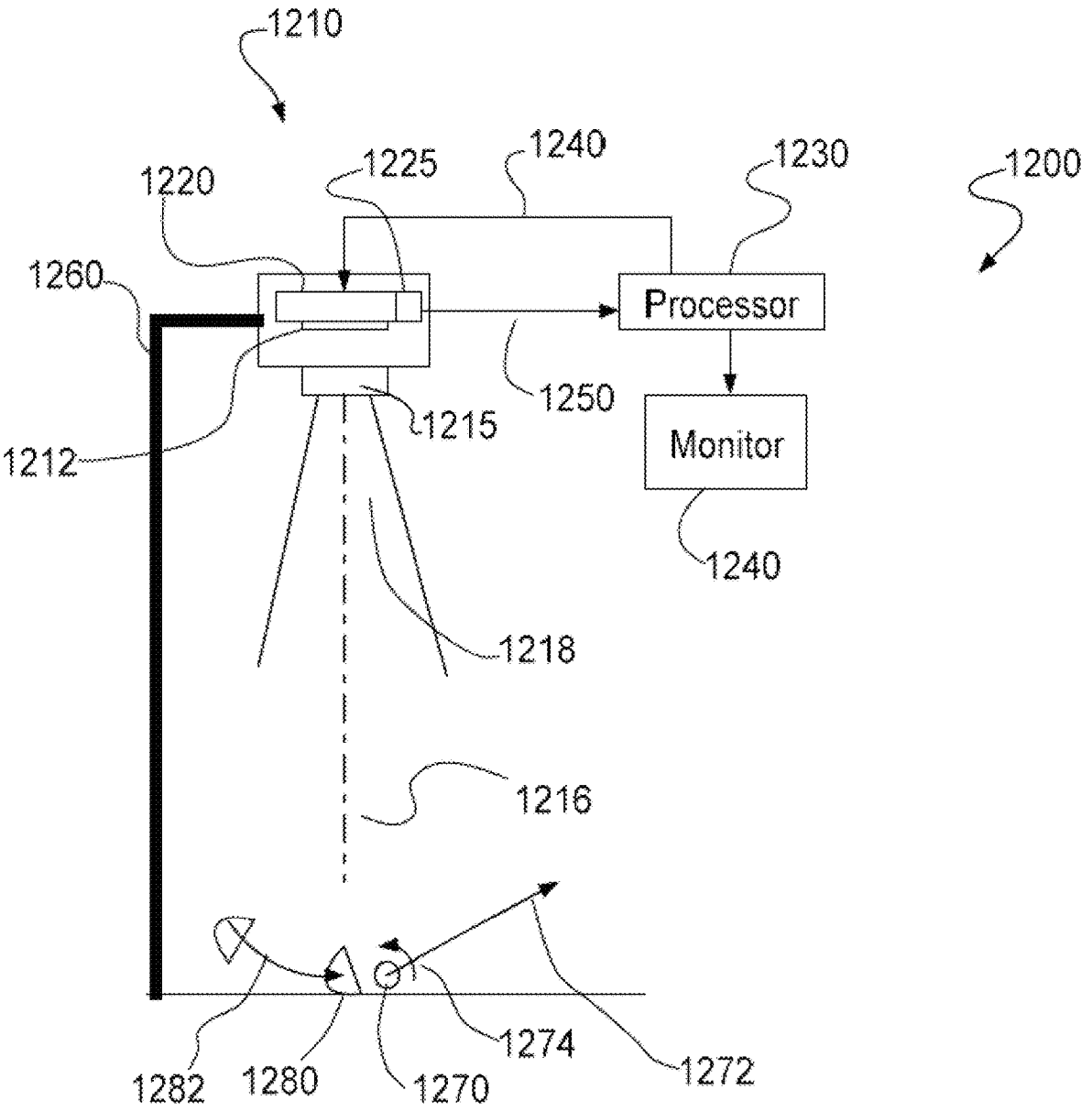
FIG. 12 shows one embodiment of an overhead launch monitor system for a golf simulator.

FIG. 12 shows an exemplary embodiment of an overhead launch monitor system 1200 for a golf simulator. The overhead launch monitor system 1200 may be for indoor use. The overhead launch monitor system 1200 according to the shown embodiment comprises a single imager 1210 arranged above a ground spot from which a golf player is expected to hit a golf ball 1270 with a golf club 1280. When playing indoors, the imager 1210 may be mounted on the ceiling or attached to a stand or rack 1260, and when playing outdoor, the imager 1210 may be fixed to a stand or rack 1260. Preferably, the imager 1210 is arranged 3-4.5 meters above the ground spot from which a golf player is expected to hit a golf ball 1270. The imager 1210 may include an optical system 1215 defining a viewing axis 1216 and an opening angle 1218 for the imager 1210. The imager 1210 has a field of view (FOV) defining a visually observable scenario. The opening angle 1218 ensures that the field of view for the imager 1210 includes the golf ball 1270, at least a part of the golf take away path for the golf club 1280, and a part of the travel path for the golf ball 1270 after being hit by the golf club 1280.

The imager 1210 may be a high-speed camera being able to operate in a normal state with e.g., 4096×2160 resolution (4K or Ultra HD) and a frame rate at 40 fps (frames per second) and in a high-speed state with a frame rate between 2000-4000 fps, and with a cropped image outputted. Controller 1220 controls the state of the imager 1210 and manages the reading from a camera sensor chip 1212 of the imager 1210.

In normal state, the digital images are provided successively to a processor 1230 via a connection 1250. The processor 1230 outputs a data stream to a monitor 1240 for showing a video of a simulated or virtual golf course. The processor 1230 is furthermore configured for analyzing captured images for identifying relevant golf balls 1270 and golf clubs 1280. Once the processor 1230, as described above, detects a golf club take away, the processor 1230 classifies that as a state change event, and the processor 1230 instructs the controller 1220 to change state from normal state to a high-speed state. The instructions also include cropping instructions indicating which part of the normal image the processor 1230 would like to receive in the high-speed state. As long as the data savings by cropping exceeds the data cost due to higher frame rate, the speed of the processor 1230 does not have to increase.

The cropped image may e.g., have a 200×200 resolution matching the region of interest (ROI), and this means that only the pixels present in the region of interest (ROI), is read out from the imager 1210 and transferred to the processor 1230 via connection 1250. This will intrude a data saving above a factor of 100, and as the data cost due to higher frame rate will be a factor between 50 and 100, the amount of data to be transferred from the imager 1210 to the processor 1230 will be slightly reduced.

When the golfer prepares a golf stroke by taking the golf club away the state is changed to high-speed state. Then the golf club 1280 is moved towards the golf ball 1270 as indicated by the arrow 1282. When the golf club 1280 impacts the golf ball 1270, the golf ball 1270 will during the impact start rolling on the hitting surface of the golf club 1280 as indicated by the arrow 1274 and exit the hitting zone along a travel path indicated by an arrow 1272. The flight of the golf ball 1270 along the travel path indicated by the arrow 1272 is determined by the impact from the golf club 1280 and the spin originating from the rolling indicated by the arrow 1272, and the initial part of the golf ball flight is recorded and analyzed by the processor 1230 for use in golf simulation to calculate and present the golf ball flight in the video of the simulated or virtual golf course streamed to the monitor 1240.

A golf ball 1270 may leave the hitting zone with a speed of e.g., 60 m/s. The imager 1210 may be able to track the golf ball 1270 for up to 1 meter before the golf ball 1270 exits the field of view for the imager 1210. This means that the imager 1210 will be able to track the golf ball 1270 for $\frac{1}{60}$ of a second. When running the imager 1210 at 3000 fps. in high-speed state, the camera can acquire approx. 50 successive images before the golf ball is out of sight.

Due to the hard cropping ratio, it is important to re-crop the camera image several times during acquisition of the image sequence. In one embodiment, the club impact is used to predict a path for the golf ball 1270, and data from the cropped images is used to correct the predicted path for the golf ball 1270. The predicted path of the golf ball 1270 is used for re-cropping the camera image to be captured. In some cases, the processor 1230 sends re-cropping instructions prior to each capturing of a cropped image.

The sensor chip 1212 may be a charge-coupled device (CCD) or a CMOS active pixel sensor. The signal processing may take place in a dedicated embedded circuit due to speed and power considerations. The sensor chip 1212 has a plurality of discrete pixel elements to be read out by the controller 1220. The controller 1220 may in the high-speed state address a subset of the discrete pixel elements for reading out a cropped image containing only a region of interest within the total imager view.

Preferably, the sensor chip 1212 is equipped with a global shutter. A global shutter applies an advanced way of reading data from the sensor chip 1212 as the entire sensor is read all at once. The global shutter operates by exposing the whole scene from top to bottom all at once, as the sensor takes snap shots of the scene contained in the field of view using all of the pixels all at once. The controller 1220 comprises a cropping unit 1225. The cropping unit 1225 is configured to receive data read out from the sensor chip 1212 as data input, and data from the processor 1230 regarding the region of Interest as control input and deliver cropped image data for the region of interest in the high-speed state of the imager 1210. The cropping unit 1225 passes image data (cropped image) for the region of interest to the processor 1230. Hereby, the cropping unit 1225 disregards from all image data captured by the sensor chip 1212 outside the region of interest.

The cropping unit 1225 may contain logic circuit be implemented by using purpose-built hardware such as application-specific integrated circuit.

There are several benefits to reading the sensor all at once. This minimizes the risk of any warping or distortion when shooting fast moving subjects. The imager 1210 also becomes more robust towards vibrations. This also benefits video, as there will be no wobbling effects when filming in high-speed environments.

The imager 1210 does not require mechanical shutter blades, which means fewer moving parts and less chance of the camera breaking down. For indoor use, sufficient background light is required to obtain high quality cropped images, but this is easier with a global shutter as sync requirements are lower compared to e.g., a roller shutter set up.

According to this aspect of the invention, the processor 1230 receives data for the imager 1210 and controls the state of the imager 1210 by means of data acquired by the imager 1210 itself.

Figure 13:
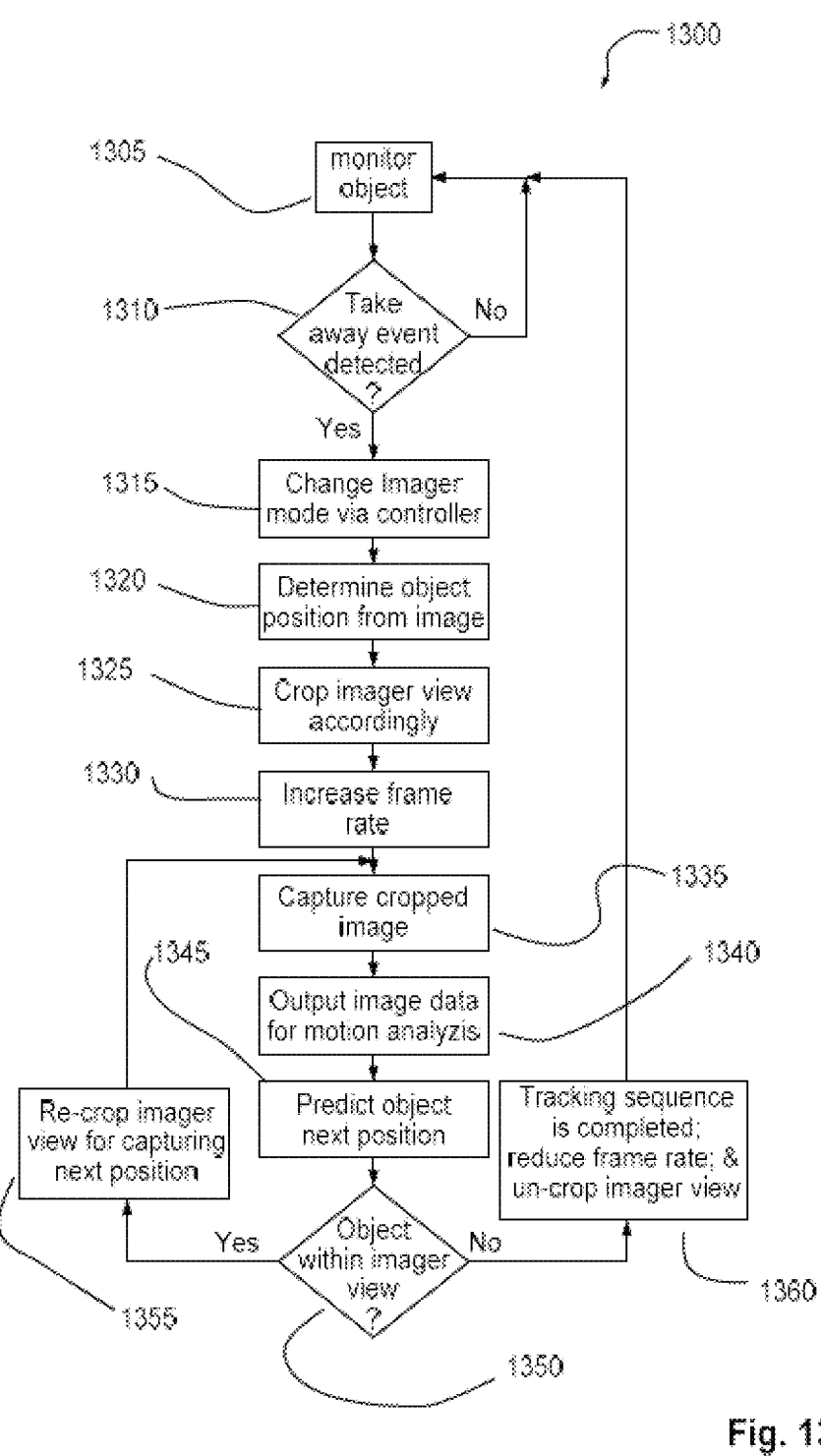
FIG. 13 shows a flow chart for operations performed by the processor of FIG. 12 beginning prior to a take away event, during the flight of a golf ball, and terminating when the golf ball is out of the imager field of view.

FIG. 13 shows a flow chart for operations performed by the system of FIG. 12 beginning prior to a take away event, during the flight of a golf ball, and terminating when the golf ball is out of the imager field of view. In step 1305, the imager 1210 captures images of the ground spot from which a golf player is expected to hit a golf ball 1270. The images are captured at a normal video frame rate (e.g., at 40 fps). The captured image data is transferred to the processor 1230. In step 1310, the processor looks for elements in the image data that could indicate the presence of a take away event. As long as no take away event is detected, the imager 1210 continues to capture images at normal video frame rate at the normal state, and to transfer the image data to the processor 1230. If, in step 1310, the processor 1230 identifies elements in the image data that could indicate the presence of a take away event, the processor 1230 instructs the imager 1210 via the controller 1220, in step 1315, to change state from normal state to a high-speed state.

The processor 1230 determines the position of the object or golf ball 1270 and, in step 1320, predicts the position of the golf ball 1270 for the next image to be captured. If the golf club 1280 has not yet hit the golf ball 1270, the processor 1230 assumes that the golf ball 1270 remains in the same position. Once hit, the processor 1230 determines the position of the golf ball 1270 by means of the geometry of the golf club 1280 and the way it impacts the golf ball 1270. In flight the position of the golf ball 1270 is determined from its past position, its speed, and its spin.

After the processor 1230 has determined the position of the golf ball 1270 for the next image, in 1325, the processor 1230 instructs the imager 1210 via the controller 1220 to crop the image to contain the Region of Interest (ROI), including the golf ball and a surrounding background in a cropped image. In one example, the golf ball 1270 occupies at least 10% of the pixels in the cropped image. In another example, the golf ball 1270 occupies at least 50% of the pixels in the cropped image. In step 1330, the processor 1230 instructs the imager 1210 via the controller 1220 to assume a frame rate between 2000-4000 fps in the high-speed state.

In step 1335, the imager 1210 captures an image cropped according to the image cropping instructions sent to the controller of the imager 1210 in step 1325. The cropped image contains a region of interest within the field of view for the imager 1210 and is intended to follow the estimated travel path for the ball in flight. The cropped image is captured by addressing only a subset of the discrete pixel elements of the sensor chip 1212 for transfer to the processor 1230.

In step 1340, the cropped image is transferred to the processor 1230. The processor 1230 uses the cropped image to adjust the estimated travel path for the ball in flight for subsequent cropped images. In step 1345, the processor 1230 predicts the next position of the object (e.g., the golf ball 1270). The processor 1230 furthermore uses the cropped image to calculate flight parameters including spin for use by the golf simulator. In step 1350, the processor 1230 checks whether the golf ball 1270 still is within the field of view of the imager 1210. If the golf ball 1270 still is within the field of view of the imager 1210, in step 1355, the processor 1230 instructs the imager 1210 to capture the next image in the second image sequence based on the next position of the object predicted in step 1345. Step 1355 defines a re-cropping of the image as a new subset of the discrete pixel elements is addressed as region of interest within the field of view for the imager 1210 moves along travel path of the object or the golf ball 1270.

As long as the golf ball 1270 remains within the field of view of the imager 1210, the processor 1230 runs through steps 1335, 1340, 1345, 1350 and 1355 multiple times in order to capture a plurality of images defining the sequence of cropped images in the high-speed state of the imager 1210.

When the processor 1230, in step 1350, determines that the object or the ball 1270 has left the field of view of the imager 1210, the processor 1230 proceeds to step 1360. In 1360, the tracking sequence is deemed to have been completed. The sequence of cropped images is completed, and the high-speed state is terminated, and the processor 1230 instructs the controller 1220 to assume the normal state for the imager, whereby the framerate is set according to the normal state, and the imager no longer crops the imaging. Here the processor 1230 ensures that the imager 1210 capture images of the ground spot from which a golf player is expected to hit a golf ball 1270 in normal state until elements in the image data that could indicate the presence of a take away event.

In one embodiment, the processor 1230 may receive assisting input for use in state change event detection and for travel path estimation for the ball in flight from a tracking radar applying doppler radar tracking.

Figure 14:
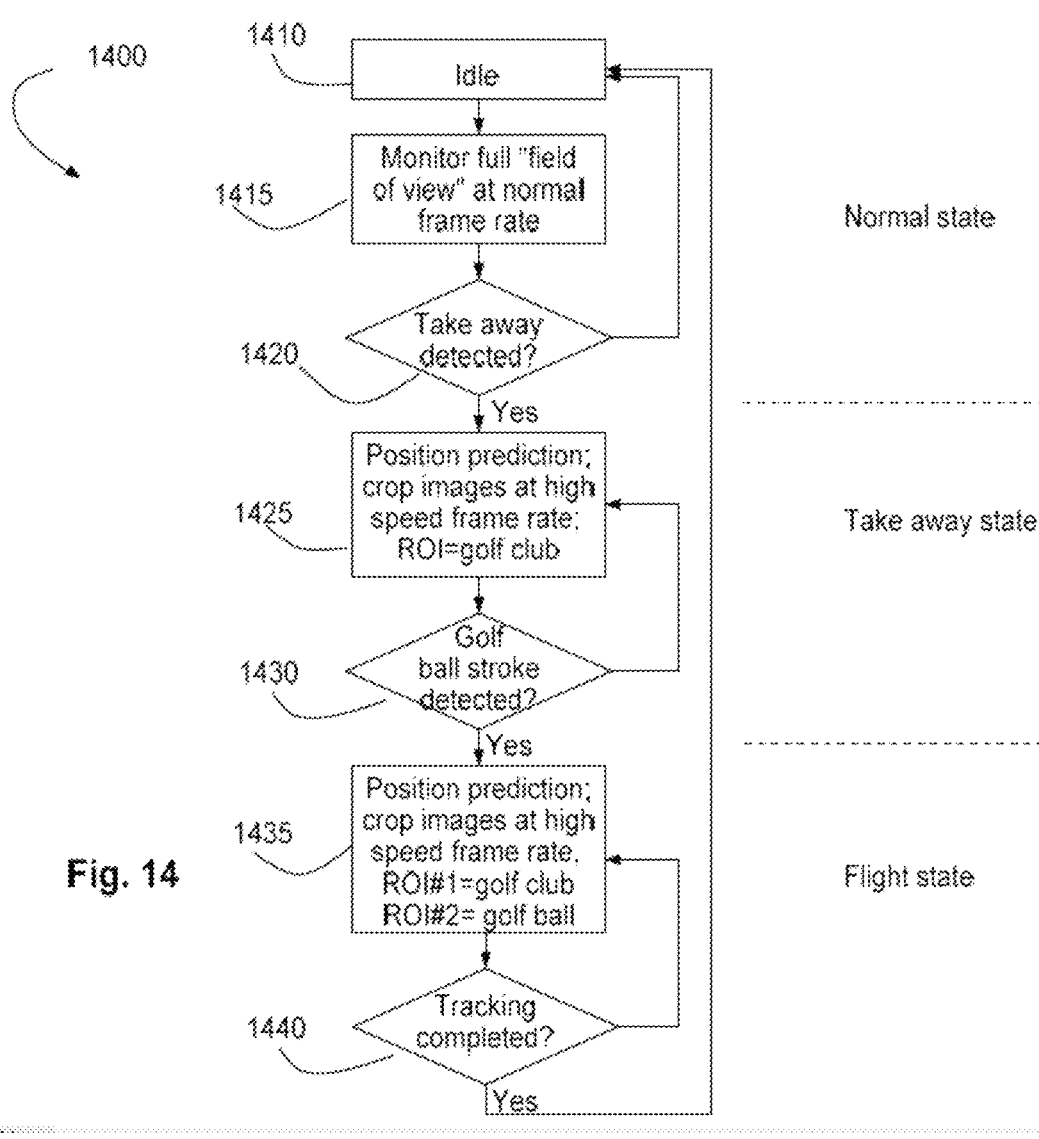
FIG. 14 illustrates a state diagram for the system shown in FIG. 12.

FIG. 14 illustrates a state diagram 1400 for the system shown in FIG. 12. The imager 1210 assumes various operational states including a normal state, a take away state, and a flight state.

In the normal state, the system will assume an idle step 1410 in which the imager 1210 observes the entire scene within the field of view at a normal frame rate. In step 1415, when receiving an image, the processor 1230 investigates for a state change event formed as a club take away. As long as no state change event has been detected in step 1420, the imager 1210 remains in the normal state passing images showing the entire scene within the field of view at a normal frame rate to the processor 1230 looking for a state change event such as a club take away.

When processor 1230 detects a first state change event, e.g., a club take away, in step 1420, the processor 1230 instructs the imager 1210 to enter the take away state. Based on the images used for detecting the first state change event, the processor 1230 will also be able to communicate a predicted position and size of the region of interest (ROI) containing the interesting object, e.g., the golf ball or the golf club. In step 1425, the imager 1210 starts operating at the high speed frame rate and starts cropping the images. Hereafter cropped images are passed to the processor 1230 looking for another state change event, e.g., a golf ball strike. As long as no state change event has been detected in step 1430, the imager 1210 remains in the take away state passing cropped images showing the region of interest to the processor 1230. In one embodiment, if no golf ball strike occurs within a predetermined duration, and/or if the golf swing is abandoned without striking the golf ball, then the processor 1230 can detect a state change event and return to the normal state.

When processor 1230 detects a second state change event comprising a strike of the golf ball, in step 1430, the processor 1230 instructs the imager 1210 to enter the flight state. Based on the cropped images used for detecting the second state change event, the processor 1230 will also be able to communicate a predicted position and size of the region of interest (ROI) containing the interesting object(s), e.g., the golf ball and the golf club. The golf ball is tracked to determine its spin and the golf club is tracked to provide knowledge of the golf club path before and after the golf ball stroke that can be used to improve the technique of the golf player.

When the second state change event is detected, the imager 1210 enters in step 1435 into flight state and operates at the high speed frame rate. In one embodiment, the first object of interest is the golf ball 1270 and the second object of interest is the golf club 1280. The imager 1210 captures a first sequence of cropped images comprising the first region of interest comprising the golf ball 1270 and a second sequence of cropped images comprising the second region of interest comprising the golf club 1280. Consequently, the processor will receive a first cropped image sequence showing the golf ball in flight and a second cropped image sequence showing the golf club after impact.

The cropping of the images is changed from image to image in the cropped image sequences as golf ball and or the golf club moves within the field of view of the imager 1210.

When the processor 1230 in state 1440 deems the travel path of the golf ball within the field of view of the imager 1210 to have been completed, the processor 1230 deems this as being a state change event, and the system reassumes the normal state in step 1410 and waits for the state change event to be detected.

Figure 15:
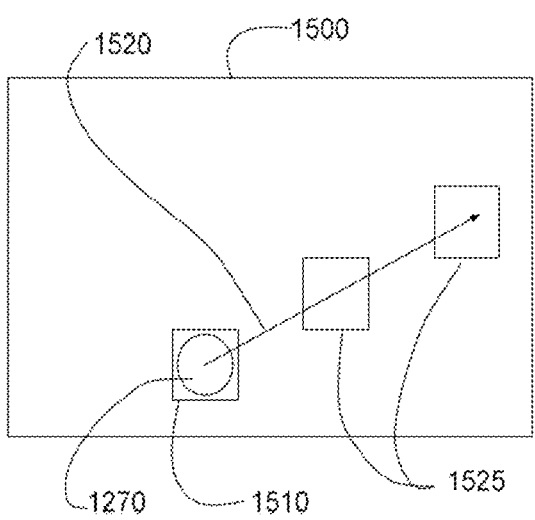
FIG. 15 illustrates an image captured in normal state by the imager of FIG. 12 having a field of view (FOV) defining a visually observable scenario.

FIG. 15 illustrates an image 1500 captured in normal state by the imager 1210 having a field of view (FOV) defining a visually observable scenario. Inside the image 1500, the golf ball 1270 is seen. In case a state change event, e.g., a golf club take away, is detected, the state of the imager 1210 is changed to high-speed state, and the image 1500 captured for the first image sequence will change to a cropped image 1510 for the second image sequence. It is seen that the golf ball 1270 occupies a significant part of the cropped image 1510. The estimated travel path 1520 for the golf ball 1270 with field of view of the imager 1210 is shown. Two further cropped images 1525 are illustrated, but as explained above, the imager 1210 may acquire approx. 50 successive images before the golf ball 1270 exits the field of view for the imager 1210. The second image sequence will show the golf ball in the center of the image, while the background will change slightly from one image to the next.

Those skilled in the art will understand that there are various modifications that may be made to the disclosed embodiments without departing from the teachings of this disclosure which is intended to be limited only by the claims appended hereto. For example, it is noted that the features of the various embodiments may be combined in any manner not specifically disclaimed or logically inconsistent with specific teachings of the disclosure.

What is claimed is:

1. A system, comprising:
an imager configured with operating parameters for capturing a sequence of images; and
a processor configured to:
detect a ball and a ball striking implement in a first sequence of images captured by the imager configured with current operating parameters;
analyze one or more conditions relating to motion of the ball or motion of the ball striking implement based on location information for the ball or the ball striking implement determined from the first sequence of the images, wherein a first condition of the one or more conditions comprises a distance threshold between the ball and the ball striking implement;
when the one or more conditions are satisfied, trigger a change in an operational state of the imager; and
detect the ball in a second sequence of images captured by the imager configured with adjusted operating parameters.

2. The system of claim 1, wherein the current operating parameters comprise a first operational state and the adjusted operating parameters comprise a second operational state.

3. The system of claim 2, wherein the first operational state includes reduced operating parameters and power consumption relative to the second operational state.

4. The system of claim 3, wherein the operating parameters comprise a frame rate, a resolution or a crop of a subset of the images captured by the imager.

5. The system of claim 1, wherein a ball detection algorithm detects the ball, localizes the ball within the image, and determines location information for the ball within the image.

6. The system of claim 5, wherein the processor is further configured to track the ball across the images in the sequence to determine whether the ball is moving or stationary.

7. The system of claim 6, wherein a first second condition of the one or more conditions is the ball being stationary.

8. The system of claim 1, wherein a detection algorithm for the ball striking implement detects the ball striking implement, localizes the ball striking implement within the image, and determines location information for the ball striking implement within the image.

9. The system of claim 8, wherein the processor is further configured to track the ball striking implement across the images in the sequence to determine whether the ball striking implement is moving or stationary.

10. The system of claim 9, wherein a second condition of the one or more conditions is the ball striking implement moving away from the ball at an angle within a predetermined range of angles.

11. The system of claim 10, wherein the first and second conditions are determined based on a type of the ball striking implement and wherein different types of ball striking implements are associated with different distance and angle thresholds.

12. A method, comprising:
detecting a ball and a ball striking implement in a first sequence of images captured by an imager configured with current operating parameters;
analyzing one or more conditions relating to motion of the ball or motion of the ball striking implement based on location information for the ball or the ball striking implement determined from the first sequence of the images, wherein a first condition of the one or more conditions comprises a distance threshold between the ball and the ball striking implement;

when the one or more conditions are satisfied, triggering a change in an operational state of the imager; and detecting the ball in a second sequence of images captured by the imager configured with adjusted operating parameters.

13. The method of claim 12, wherein the current operating parameters comprise a first operational state and the adjusted operating parameters comprise a second operational state.

14. The method of claim 13, wherein the first operational state includes reduced operating parameters and power consumption relative to the second operational state.

15. The method of claim 14, wherein the operating parameters comprise a frame rate, a resolution or a crop of a subset of the images captured by the imager.

16. The method of claim 12, wherein a ball detection algorithm detects the ball, localizes the ball within the image, and determines location information for the ball within the image.

17. The method of claim 16, further comprising:

tracking the ball across the images in the sequence to determine whether the ball is moving or stationary.

18. The method of claim 17, wherein a second condition of the one or more conditions is the ball being stationary.

19. The method of claim 12, wherein a detection algorithm for the ball striking implement detects the ball striking implement, localizes the ball striking implement within the image, and determines location information for the ball striking implement within the image.

20. The method of claim 19, further comprising:

tracking the ball striking implement across the images in the sequence to determine whether the ball striking implement is moving or stationary.

21. The method of claim 20, wherein a second condition of the one or more conditions is the ball striking implement moving away from the ball at an angle within a predetermined range of angles.

22. The method of claim 21, wherein the first and second conditions are determined based on a type of the ball striking implement, wherein different types of ball striking implements are associated with different distance and angle thresholds.

* * * * *